(12) United States Patent
Ogawa

(10) Patent No.: US 9,497,339 B2
(45) Date of Patent: Nov. 15, 2016

(54) INFORMATION PROCESSING SYSTEM, INFORMATION PROCESSING METHOD AND RECORDING MEDIUM STORING AN INFORMATION PROCESSING PROGRAM

(71) Applicant: Yuuki Ogawa, Kanagawa (JP)

(72) Inventor: Yuuki Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/535,499

(22) Filed: Nov. 7, 2014

(65) Prior Publication Data

US 2015/0131117 A1    May 14, 2015

(30) Foreign Application Priority Data

Nov. 12, 2013 (JP) .................. 2013-233699
Apr. 17, 2014 (JP) .................. 2014-085183

(51) Int. Cl.
  *H04N 1/00*   (2006.01)
  *G06F 3/12*   (2006.01)
  *G06K 15/02*  (2006.01)

(52) U.S. Cl.
  CPC .................. *H04N 1/00344* (2013.01)

(58) Field of Classification Search
  None
  See application file for complete search history.

(56) References Cited

U.S. PATENT DOCUMENTS

2004/0093408 A1*  5/2004  Hirani et al. ........... 709/224
2004/0234278 A1*  11/2004 Saitoh et al. ........... 399/8
2005/0102119 A1*  5/2005  Alvarez et al. ......... 702/183
2007/0118638 A1*  5/2007  Ban ................ G05B 23/0272
                                               709/224
2007/0220303 A1*  9/2007  Kimura ............ G06F 11/0709
                                               714/4.11
2007/0291306 A1*  12/2007 Fujino ............... G06F 3/121
                                               358/1.15

(Continued)

FOREIGN PATENT DOCUMENTS

JP       2009-075644       4/2009

OTHER PUBLICATIONS

U.S. Appl. No. 14/284,496, filed on May 22, 2014.

*Primary Examiner* — Beniyam Menberu
(74) *Attorney, Agent, or Firm* — IPUSA, PLLC

(57) ABSTRACT

An information processing system includes a computer programmed to execute a process. The process includes receiving operation information indicating an operating state of a device at a predetermined time interval from the device through a network. The received operation information is stored in a first storing part. With respect to the device from which the operation information indicating that the operating state is abnormal is received, elimination information indicating elimination of the abnormality is received in asynchronization with the predetermined time interval. When the elimination information is received within a period from a reception of the operation information indicating that the operating state is abnormal and until a subsequent reception of the operation information, information is added to the first storing part, which indicates that the abnormality indicated by the operation information lasts from the reception of the operation information to the reception of the elimination information.

10 Claims, 20 Drawing Sheets

(56) References Cited

U.S. PATENT DOCUMENTS

| | | | |
|---|---|---|---|
| 2009/0002754 A1* | 1/2009 | Kim | G06Q 10/063 |
| | | | 358/1.15 |
| 2009/0222403 A1* | 9/2009 | Kato | 707/1 |
| 2010/0259782 A1* | 10/2010 | Kotake | G06F 11/0733 |
| | | | 358/1.15 |
| 2011/0236036 A1* | 9/2011 | Nagamine | G03G 15/502 |
| | | | 399/12 |
| 2012/0023366 A1* | 1/2012 | Horii et al. | 714/15 |
| 2012/0069395 A1* | 3/2012 | Hiraike | G06F 3/1203 |
| | | | 358/1.15 |
| 2012/0144244 A1* | 6/2012 | Dan et al. | 714/39 |
| 2013/0219212 A1* | 8/2013 | Terada et al. | 714/6.21 |
| 2014/0195865 A1* | 7/2014 | Ikegami | G06F 11/3055 |
| | | | 714/57 |
| 2014/0300916 A1* | 10/2014 | Boldt | G06F 3/1261 |
| | | | 358/1.14 |
| 2015/0012643 A1* | 1/2015 | Ogawa | H04L 41/5016 |
| | | | 709/224 |

* cited by examiner

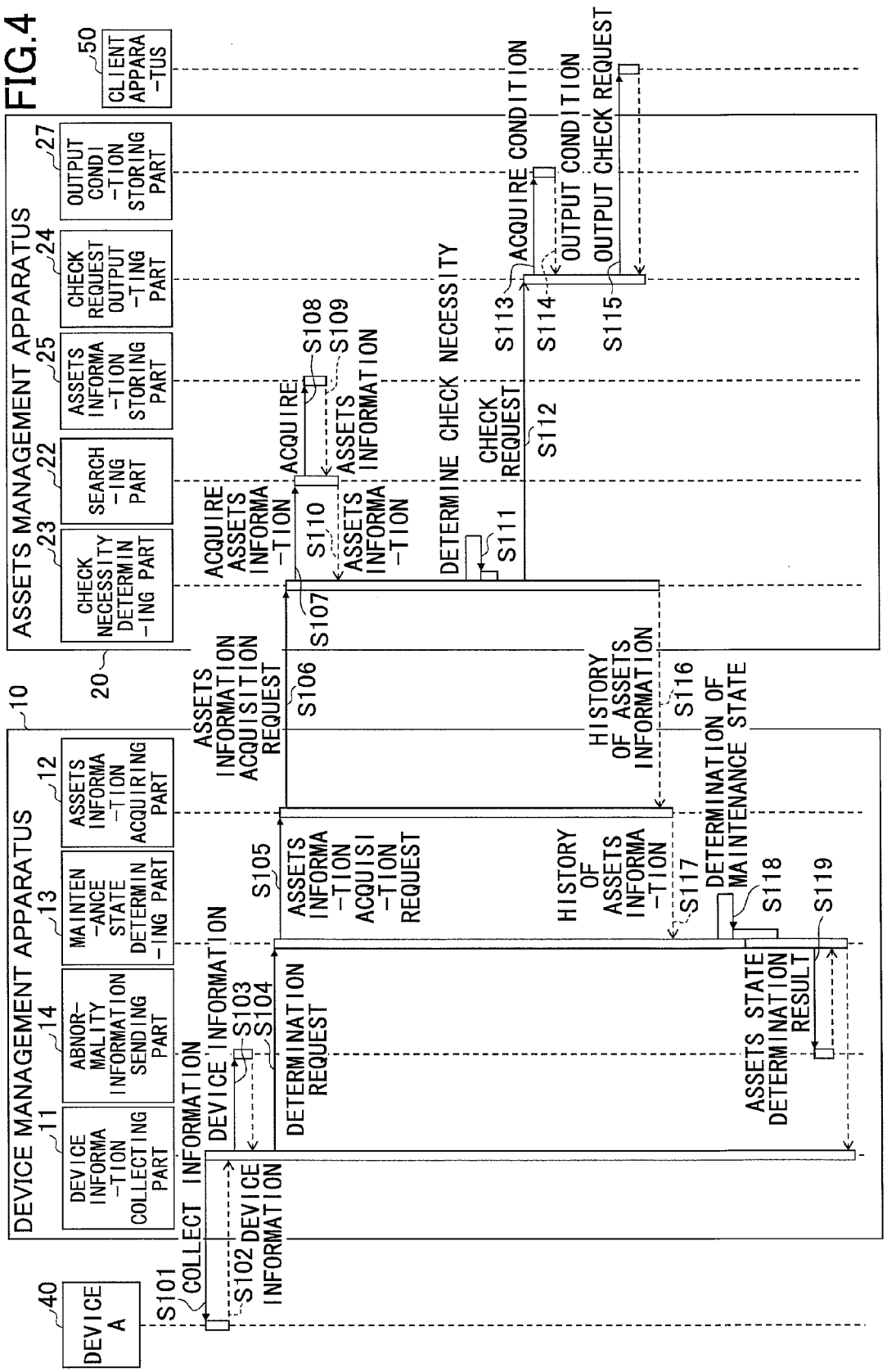

FIG.5

| DATE AND TIME | OPERATING STATE | ASSETS STATE | MAINTENANCE STATE |
|---|---|---|---|
| 2013/04/08 09:00:00 | NORMAL | INSTALLED | NORMAL (OTHER THAN MAINTENANCE TARGET) |
| 2013/04/08 12:00:00 | COVER OPEN | INSTALLED | ABNORMAL (OTHER THAN MAINTENANCE TARGET) |
| 2013/04/08 15:00:00 | NORMAL | INSTALLED | NORMAL (OTHER THAN MAINTENANCE TARGET) |
| 2013/04/08 18:00:00 | NORMAL | USABLE | NORMAL (MAINTENANCE TARGET) |
| 2013/04/08 21:00:00 | NORMAL | USABLE | NORMAL (MAINTENANCE TARGET) |
| 2013/04/09 00:00:00 | TONER RUN OUT | USABLE | ABNORMAL (MAINTENANCE TARGET) |
| 2013/04/09 03:00:00 | NORMAL | USABLE | NORMAL (MAINTENANCE TARGET) |
| 2013/04/09 06:00:00 | PAPER JAM | | |

FIG.6

| DATE AND TIME | ASSETS STATE |
|---|---|
| 2013/04/02 09:00:00 | RECEIVED |
| 2013/04/05 09:00:00 | STOCKED |
| 2013/04/07 12:00:00 | INSTALLED |
| 2013/04/08 16:00:00 | USABLE |

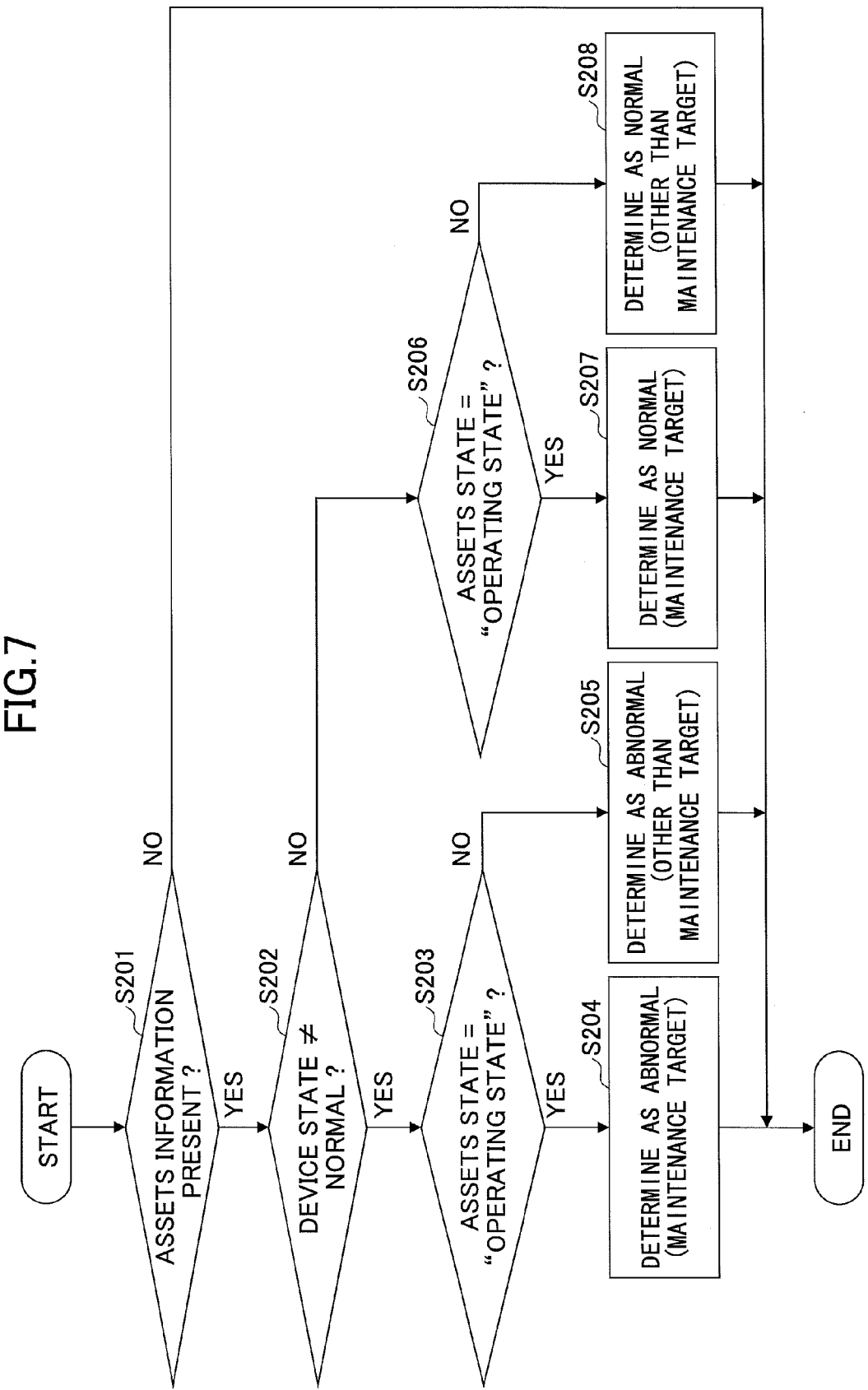

FIG.8

| DATE AND TIME | OPERATING STATE | ASSETS STATE | MAINTENANCE STATE |
|---|---|---|---|
| 2013/04/08 09:00:00 | NORMAL | INSTALLED | NORMAL (OTHER THAN MAINTENANCE TARGET) |
| 2013/04/08 12:00:00 | COVER OPEN | INSTALLED | ABNORMAL (OTHER THAN MAINTENANCE TARGET) |
| 2013/04/08 15:00:00 | NORMAL | INSTALLED | NORMAL (OTHER THAN MAINTENANCE TARGET) |
| 2013/04/08 18:00:00 | NORMAL | USABLE | NORMAL (MAINTENANCE TARGET) |
| 2013/04/08 21:00:00 | NORMAL | USABLE | NORMAL (MAINTENANCE TARGET) |
| 2013/04/09 00:00:00 | TONER RUN OUT | USABLE | ABNORMAL (MAINTENANCE TARGET) |
| 2013/04/09 03:00:00 | NORMAL | USABLE | NORMAL (MAINTENANCE TARGET) |
| 2013/04/09 06:00:00 | PAPER JAM | USABLE | ABNORMAL (MAINTENANCE TARGET) |

FIG.9

| DATE AND TIME | ASSETS STATE |
|---|---|
| 2013/04/02 09:00:00 | RECEIVED |
| 2013/04/05 09:00:00 | STOCKED |
| 2013/04/07 12:00:00 | INSTALLED |
| 2013/04/08 16:00:00 | USABLE |
| 2013/04/09 07:00:00 | MOVING |

FIG.10

| DATE AND TIME | OPERATING STATE | ASSETS STATE | MAINTENANCE STATE |
|---|---|---|---|
| 2013/04/08 09:00:00 | NORMAL | INSTALLED | NORMAL (OTHER THAN MAINTENANCE TARGET) |
| 2013/04/08 12:00:00 | COVER OPEN | INSTALLED | ABNORMAL (OTHER THAN MAINTENANCE TARGET) |
| 2013/04/08 15:00:00 | NORMAL | INSTALLED | NORMAL (OTHER THAN MAINTENANCE TARGET) |
| 2013/04/08 18:00:00 | NORMAL | USABLE | NORMAL (MAINTENANCE TARGET) |
| 2013/04/08 21:00:00 | NORMAL | USABLE | NORMAL (MAINTENANCE TARGET) |
| 2013/04/09 00:00:00 | TONER RUN OUT | USABLE | ABNORMAL (MAINTENANCE TARGET) |
| 2013/04/09 03:00:00 | NORMAL | USABLE | NORMAL (MAINTENANCE TARGET) |
| 2013/04/09 06:00:00 | PAPER RUN OUT | MOVING | ABNORMAL (OTHER THAN MAINTENANCE TARGET) |

| OPERATING STATE | ALLOWABLE PERIOD |
|---|---|
| PAPER RUN OUT | 1 DAY |
| TONER RUN OUT | 1 DAY |
| COVER OPEN | 3 HOURS |
| PRESSURE ROLLER MALFUNCTION | 7 DAYS |
| : | : |

FIG.18

| DATE AND TIME | OPERATING STATE | ASSETS STATE | MAINTENANCE STATE |
|---|---|---|---|
| 2013/04/08 09:00:00 | NORMAL | INSTALLED | NORMAL (OTHER THAN MAINTENANCE TARGET) |
| 2013/04/08 12:00:00 | COVER OPEN | INSTALLED | ABNORMAL (OTHER THAN MAINTENANCE TARGET) |
| 2013/04/08 15:00:00 | NORMAL | INSTALLED | NORMAL (OTHER THAN MAINTENANCE TARGET) |
| 2013/04/08 18:00:00 | NORMAL | USABLE | NORMAL (MAINTENANCE TARGET) |
| 2013/04/08 21:00:00 | NORMAL | USABLE | NORMAL (MAINTENANCE TARGET) |
| 2013/04/09 00:00:00 | TONER RUN OUT | USABLE | ABNORMAL (MAINTENANCE TARGET) |
| 2013/04/09 03:00:00 | NORMAL | USABLE | NORMAL (MAINTENANCE TARGET) |
| 2013/04/09 06:00:00 | PAPER JAM | USABLE | ABNORMAL (MAINTENANCE TARGET) |
| 2013/04/09 07:10:00 | NORMAL | USABLE | NORMAL (MAINTENANCE TARGET) |

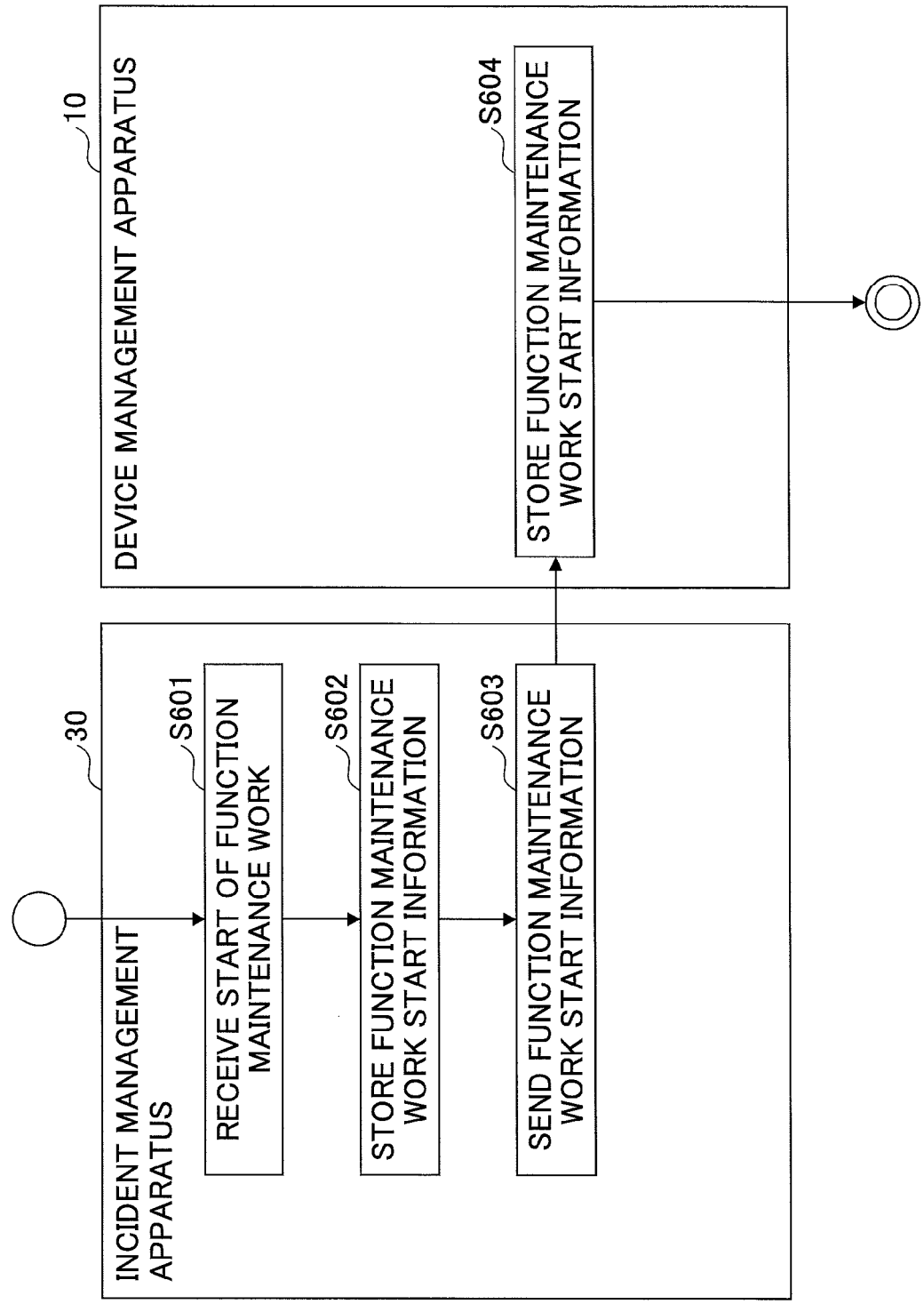

FIG.21

| DATE AND TIME | OPERATING STATE | ASSETS STATE | MAINTENANCE STATE |
|---|---|---|---|
| 2013/04/08 09:00:00 | NORMAL | INSTALLED | NORMAL (OTHER THAN MAINTENANCE TARGET) |
| 2013/04/08 12:00:00 | COVER OPEN | INSTALLED | ABNORMAL (OTHER THAN MAINTENANCE TARGET) |
| 2013/04/08 15:00:00 | NORMAL | INSTALLED | NORMAL (OTHER THAN MAINTENANCE TARGET) |
| 2013/04/08 18:00:00 | NORMAL | USABLE | NORMAL (MAINTENANCE TARGET) |
| 2013/04/08 21:00:00 | NORMAL | USABLE | NORMAL (MAINTENANCE TARGET) |
| 2013/04/09 23:55:00 | START FUNCTION MAINTENANCE WORK | | |
| 2013/04/09 00:00:00 | COVER OPEN | USABLE | ABNORMAL (OTHER THAN MAINTENANCE TARGET) |
| 2013/04/09 03:00:00 | NORMAL | USABLE | NORMAL (OTHER THAN MAINTENANCE TARGET) |
| 2013/04/09 04:30:00 | END FUNCTION MAINTENANCE WORK | | |
| 2013/04/09 06:00:00 | NORMAL | USABLE | NORMAL (MAINTENANCE TARGET) |

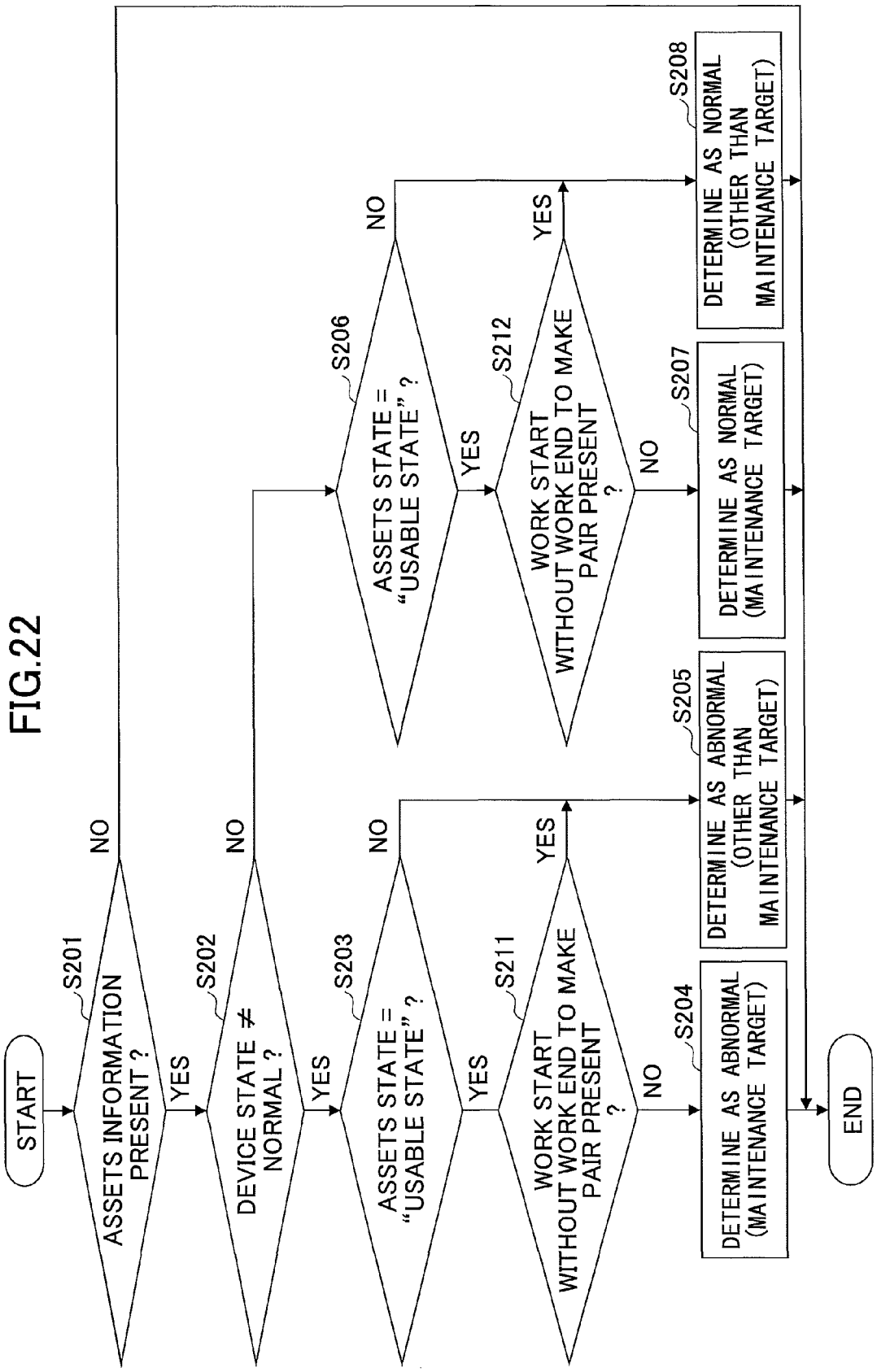

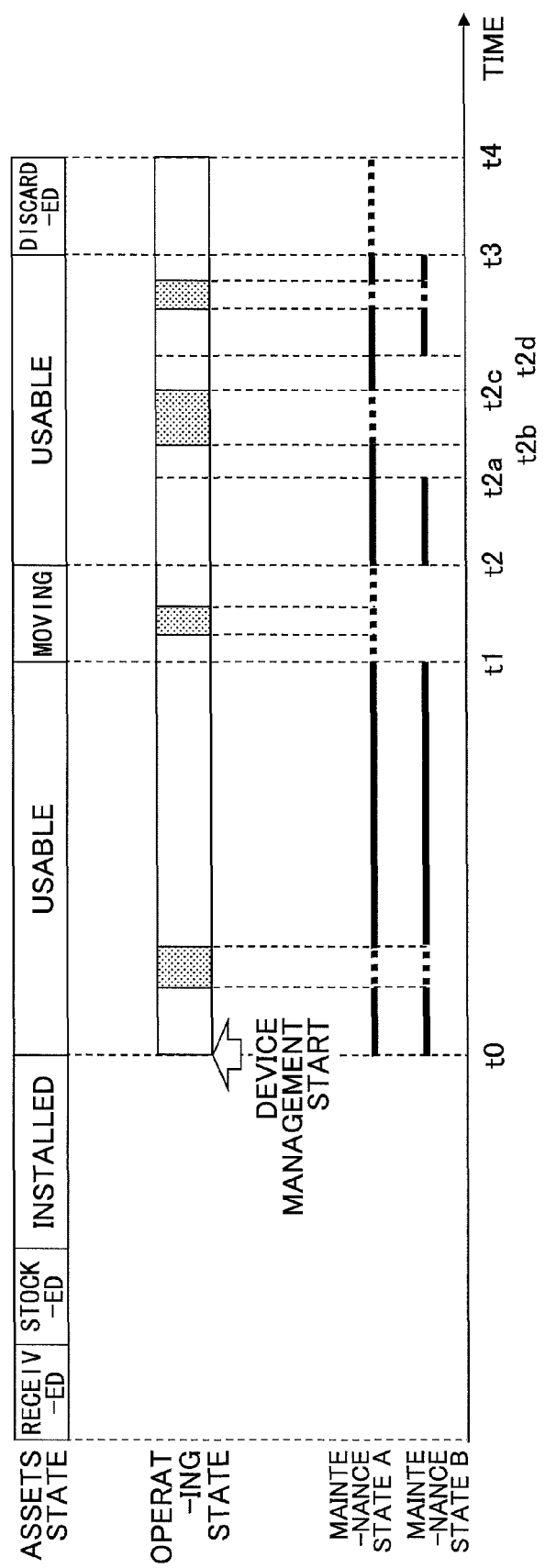

INFORMATION PROCESSING SYSTEM, INFORMATION PROCESSING METHOD AND RECORDING MEDIUM STORING AN INFORMATION PROCESSING PROGRAM

CROSS-REFERENCE TO RELATED APPLICATION

The present application is based upon and claims the benefit of priority of Japanese Patent Applications No. 2013-233699, filed on Nov. 12, 2013, and No. 2014-085183, filed on Apr. 17, 2014, the entire contents of which are incorporated herein by reference.

BACKGROUND OF THE INVENTION

1. Field of the Invention

The present invention generally relates to an information processing system, an information processing method and a recording medium storing an information processing program.

2. Description of the Related Art

There may be a case where a service level agreement (SLA) is made between a device vender and a client, the device vender vending, for example, an image forming apparatus such as a multifunction peripheral; copy machine, scanner, printer, facsimile, camera, etc. In the service level agreement, warranty contents with respect to a normal operation of a device are defined with an operating rate of the device as an index.

As means for implementing the service level agreement, it is considered to use a system for remotely monitoring a state of a device through a network (hereinafter, referred to as the "device management system"). Using the device management system, it is expected to improve an operating rate of a device by detecting a malfunction early to take a rapid response to the malfunction.

If a device malfunction is detected in the device management system, there may be a case where it is not appropriate to determine the duration of the device malfunction based on information acquired from the device by the device management system.

For example, in a case where the device management system periodically acquires information from a device at a predetermined time interval, elimination of an abnormality, which is detected at a certain time point, may be detected, at the earliest, after the predetermined time interval has passed from the certain time point. Thus, if the abnormality is eliminated within the predetermined time interval, it is possible that the duration of the abnormality is estimated to be longer than the actual duration.

SUMMARY OF THE INVENTION

There is provided according to an aspect of the invention an information processing system including at least one computer programmed to execute a process. The process includes receiving operation information indicating an operating state of a device at a predetermined time interval from the device through a network and storing the received operation information in a first storing part. With respect to the device from which the operation information indicating that the operating state is abnormal is received, elimination information indicating elimination of the abnormality is received in asynchronization with the predetermined time interval. When the elimination information is received within a period from a reception of the operation information indicating that the operating state is abnormal and until a subsequent reception of the operation information, information is added to the first storing part which indicates that the abnormality indicated by the operation information lasts from the reception of the operation information to the reception of the elimination information.

There is provided according to another aspect of the invention an information processing system including a first information processing apparatus and a second information processing apparatus. The first information processing apparatus includes a computer programmed to execute a process. The process includes receiving operation information indicating an operating state of a device at a predetermined time interval from the device through a network, and storing the received operation information in a first storing part. With respect to the device from which the operation information indicating that the operating state is abnormal is received, elimination information indicating elimination of the abnormality is received in asynchronization with the predetermined time interval. When the elimination information is received within a period from a reception of the operation information indicating that the operating state is abnormal and until a subsequent reception of the operation information, information is added to the first storing part which indicates that the abnormality indicated by the operation information lasts from the reception of the operation information to the reception of the elimination information.

There is provided according to a further aspect of the invention an information processing method performed by an information processing system including at least one computer. The information processing method includes receiving operation information indicating an operating state of a device at a predetermined time interval from the device through a network, and storing the received operation information in a first storing part. With respect to the device from which the operation information indicating that the operating state is abnormal is received, elimination information indicating elimination of the abnormality is received in asynchronization with the predetermined time interval. When the elimination information is received within a period from a reception of the operation information indicating that the operating state is abnormal and until a subsequent reception of the operation information, information is added to the first storing part which indicates that the abnormality indicated by the operation information lasts from the reception of the operation information to the reception of the elimination information.

Other objects, features and advantages of the present invention will become more apparent from the following detailed description when read in conjunction with the accompanying drawings.

The objects and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 4 is a sequence chart of a process performed by the device management apparatus and an assets management apparatus;

FIG. 5 is an illustration of a configuration of a device state history storing part;

FIG. 6 is an illustration of a first example of a search result of assets information;

FIG. 7 is a flowchart of a determining process of a maintenance state;

FIG. 8 is an illustration of a first example of storage of the assets state and maintenance state in the device state history storing part;

FIG. 9 is an illustration of a second example of the search result of the assets information;

FIG. 10 is an illustration of a second example of storage of the assets state and maintenance state in the device state history storing part;

FIG. 18 is an illustration indicating an addition of a record to the device state history storing part based on abnormality elimination information;

FIG. 20 is a flowchart of a process performed at a time of starting a function maintenance operation;

FIG. 21 is an illustration indicating an addition of a record to the device state history storing part based on information regarding a start and end of the function maintenance operation;

FIG. 22 is a flowchart of another determining process of a maintenance state; and FIG. 23 is an illustration of a maintenance state of a device.

DETAILED DESCRIPTION OF THE EMBODIMENTS

A description will now be given, with reference to the drawings, of embodiments of the present invention.

Figure 1:
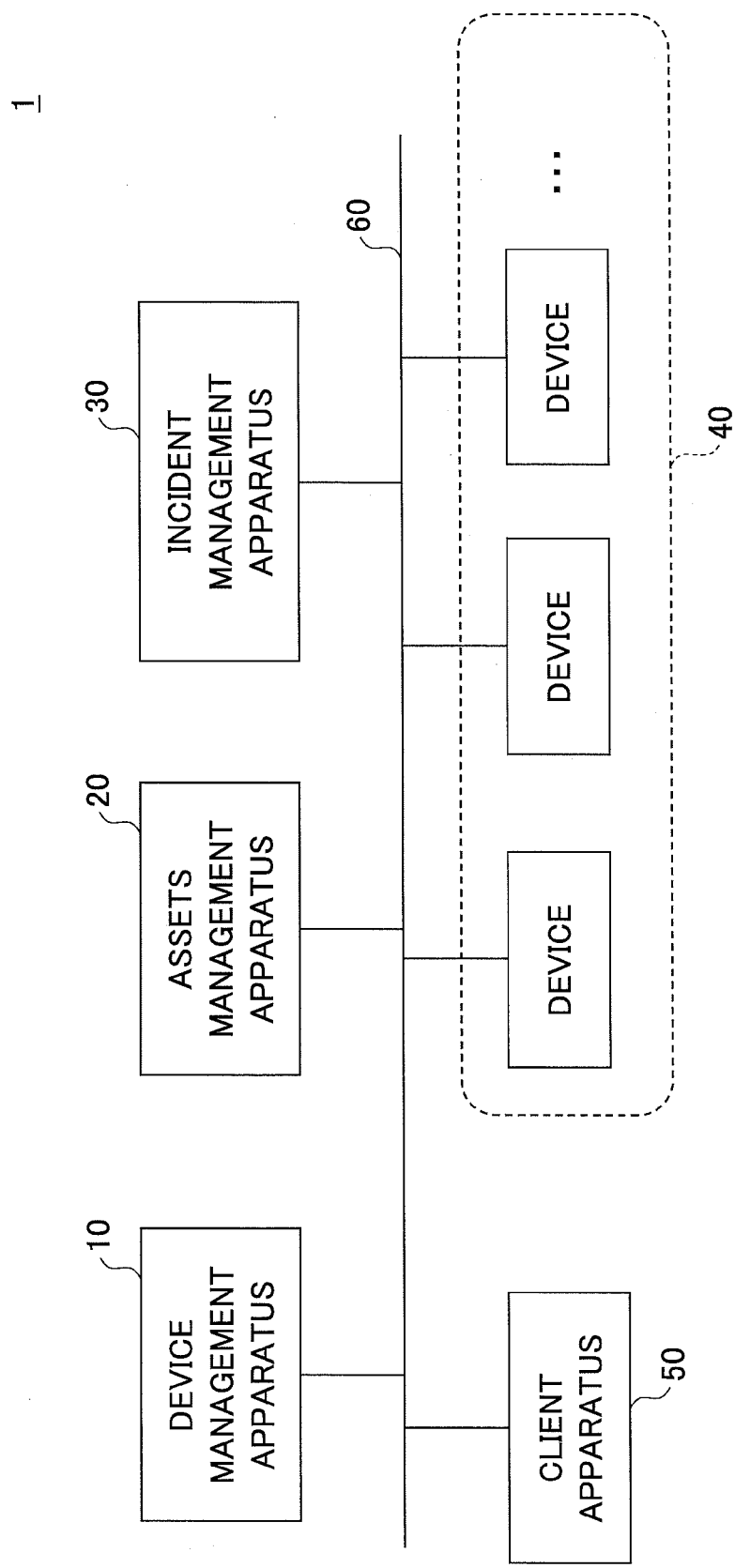
FIG. 1 is a block diagram of an information processing system according to an embodiment of the present invention.

FIG. 1 is a block diagram of an information processing system according to an embodiment of the present invention. As illustrated in FIG. 1, a device management apparatus 10, assets management apparatus 20, incident management apparatus 30, plurality of devices 40 and client apparatus 50 are mutually connected through a network 60 such as a local area network (LAN) or a wide area network (WAN).

Each of the devices 40 is an image forming apparatus such as, for example, a multifunction peripheral, copy machine, scanner, printer, etc. However, each of the devices 40 may be an electronic device other than the image forming apparatus, such as a projector, electronic blackboard, television conference system, digital camera, etc. Hereinafter, each of the devices 40 may be referred to as the "device 40".

The device management apparatus 10 includes one or more computers that remotely monitor an operating state of the device 40. For example, the device management apparatus 10 repeatedly collects information regarding the device 40 (hereinafter, referred to as the "device information") from each of the devices 40, for example, periodically at a fixed time interval. The device information includes information indicating an operating state of the device 40 (hereinafter may be referred to as the "operation information". The operation information includes information indicating an abnormality such as a malfunction or a shortage of consumables in the device 40, and also includes attribute information such as information regarding a counter of the device 40 that varies in response to use of the device 40. Here, the counter is a parameter or an attribute item provided for each of targets for measurement that is incremented in response to printing or scanning.

In the present embodiment, a normal state with respect to an operating state of the device 40 corresponds to a state where an original performance or function of the device 40 can be used normally. On the other hand, an abnormal state with respect to an operating state of the device 40 corresponds to a state where an original performance or function of the device 40 cannot be used. A state where consumables have run out, such as a state where toner or paper has run out, is also included in the abnormal state. Note that which state of the operating state is specified as normal or abnormal may be defined in a contract such as a service level agreement (SLA) that is made between a vendor or maintenance company of the device 40 and a user or client using the device 40.

A time period during which the operating state is normal is included in a mean time between failures (MTBF) in the computation of an operating rate of the device 40. On the other hand, a time period during which the operating state is abnormal is included in a mean time to repair (MTTR) in the computation of an operating rate of the device 40.

In the present embodiment, the following formula (1) is used as a formula for calculating an operating rate for the sake of convenience.

$$\text{Operating Rate}=\text{MTBF} \div (\text{MTBF}+\text{MTTR}) \tag{1}$$

Note that the formula for calculating an operating rate may also be defined in the service level agreement (SLA).

The assets management apparatus 20 is a computer that manages assets information of the device 40. For example, the assets information is information necessary for a usual assets management. In the present embodiment, the assets information includes information indicating a state where the device 40 is regarded as assets (hereinafter, referred to as the "assets state") other than the attribute information of the device 40. The assets information of the device 40 indicates states constituting a life cycle of the device 40 under the assets management. In the present embodiment, the assets information includes a received state, stocked state, installed state, usable state, moving state and discarded state. The received state is a state where the device 40 is received. The stocked state is a state where the reception of the device 40 is completed and the device 40 is managed as a stocked item. The installed state is a state where installation work of the device 40 is being performed. The usable state is a state where the device 40 is usable by a user or client. The moving state is a state where the device 40 is being moved to another installation location. The discarded state is a state where the device 40 is discarded. In the usable state from among these states, the device 40 is usable by a user. Note that a user of the assets management apparatus 20 may arbitrarily define the type of the assets state.

The incident management apparatus 30 is a computer that manages information with respect to incidents of the device 40 (hereinafter, referred to as the "incident information"). The incident corresponds to a state where a user cannot effectively use a function of the device 40. In the present embodiment, the incident is an idea or event including an abnormal state in the operating state of the device 40. For example, a customer engineer performs a maintenance work to respond to a failure based on the incident information managed by the incident management apparatus 30. The incident information includes operation information indicating an abnormal state of the device 40 and information indicating elimination of the abnormal state.

The incident is a phenomena that occurs in the usable state in the assets management. That is, the incident corresponds to a state where the device 40 cannot be used normally despite of the state where the device 40 is set to be used normally. Accordingly, the assets state and the incident are ideas or events that belong to mutually different layers in view of the state of the device 40.

The client apparatus 50 is an information processing apparatus serving as a user interface with respect to the device management apparatus 10 and the assets management apparatus 20. That is, a user inputs a request to the device management apparatus 10, assets management apparatus 20 and incident management apparatus 30 through the client apparatus 50. As an example of the client apparatus 50, there are a personal computer (PC), tablet-type terminal, smartphone, cellular phone, etc.

Figure 2:
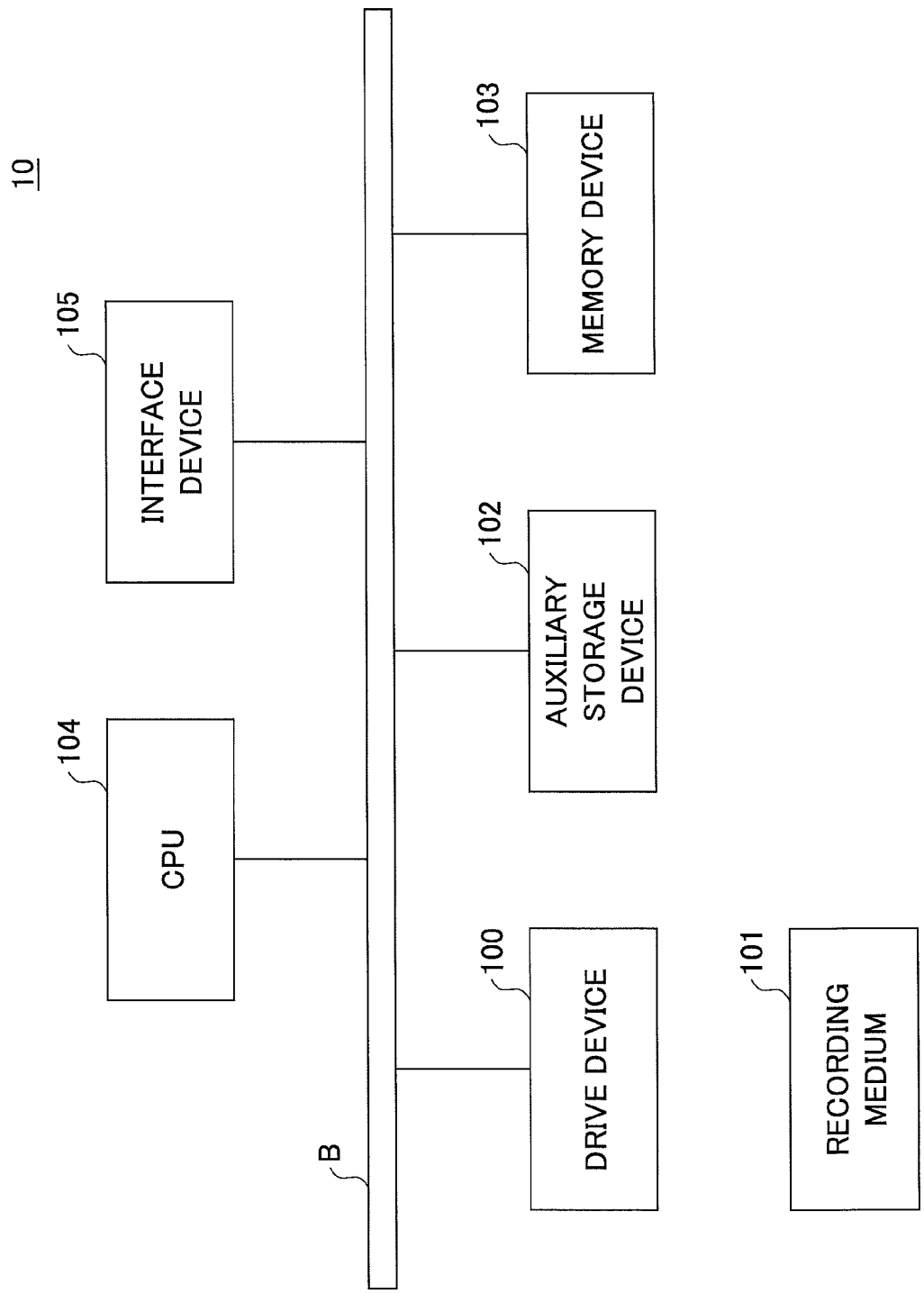
FIG. 2 is a block diagram of a hardware structure of a device management apparatus according to the embodiment of the present invention.

FIG. 2 is a block diagram illustrating a hardware structure of the device management apparatus 10. As illustrated in FIG. 2, the device management apparatus 10 includes a drive device 100, auxiliary storage device 102, memory device 103, central processing unit (CPU) 104, interface device 105, etc.

A program for achieving the process by the device management apparatus 10 is provided by a recording medium 101 such as a CD-ROM or the like. When the recording medium 101 storing the program is set in the drive device 100, the program is sent to the auxiliary storage device 102 from the recording medium 101 through the drive device 100, and is installed auxiliary storage device 102. Note that it is not always necessary to send the program from the recording medium 100, and the program may be downloaded from other computers through the network. The auxiliary storage device 102 stores the installed program and also stores necessary files and data.

The memory device 103 reads the program from the auxiliary storage device 102, when a start command of the program is received, and stores the read program therein. The CPU 104 performs functions with respect to the device management apparatus 10 according to the program stored in the memory device 103. The interface device 105 is used as an interface for connecting to the network.

The device management apparatus 10 may be constituted by one or more computers. Each of the assets management apparatus 20 and the incident management device 30 may also have the hardware structure illustrated in FIG. 2 and may be constituted by one or more computers. The device management apparatus 10, assets management apparatus 20 and incident management apparatus 30 may be materialized by one or more computers of the same-type.

Figure 3:
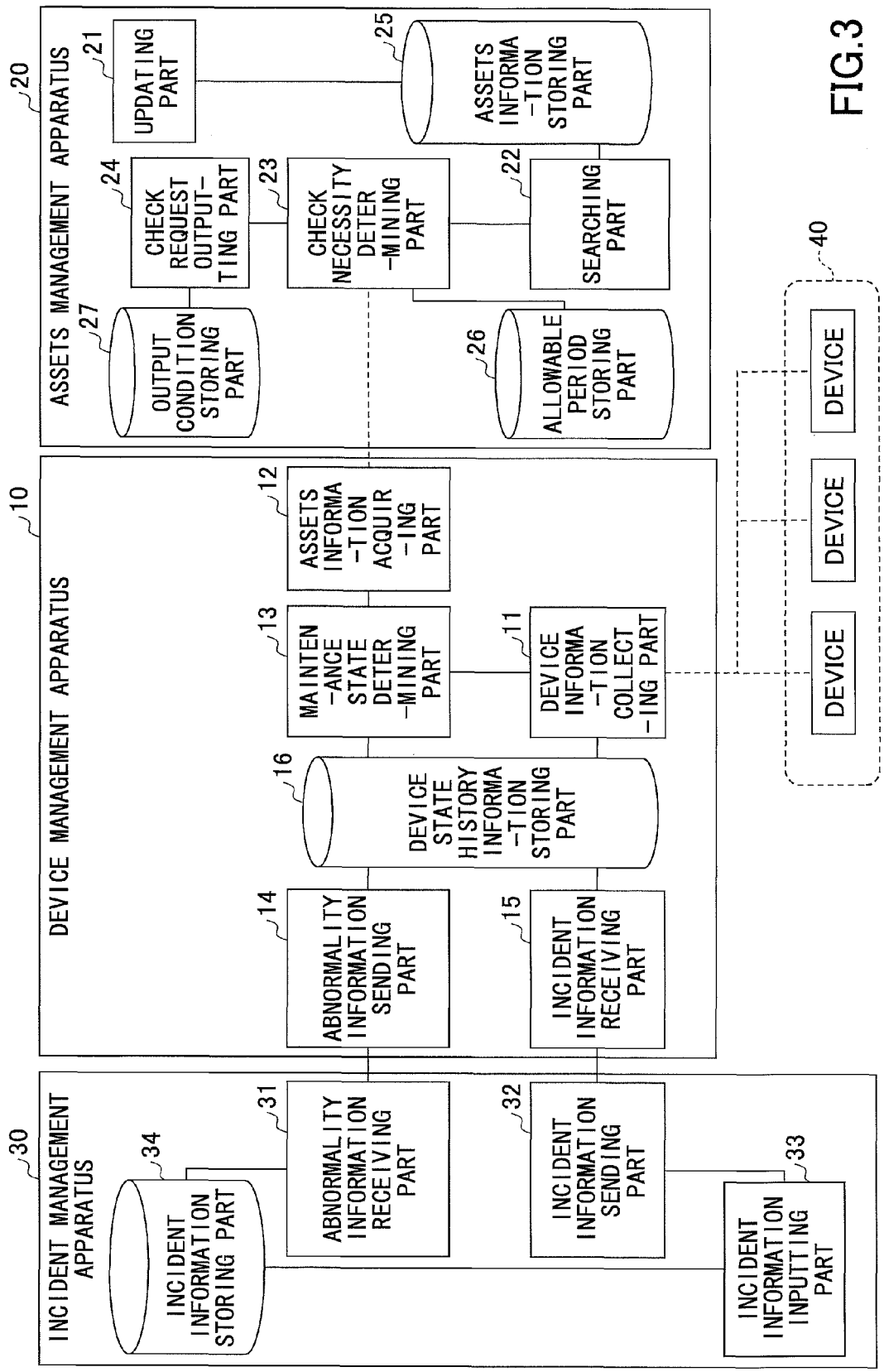
FIG. 3 is a block diagram of a system structure of the information processing system according to the embodiment of the present invention.

FIG. 3 is a block diagram illustrating a system configuration of the information processing system 1. In the information processing system 1, the device management apparatus 10 includes a device information collection part 11, assets information acquiring part 12, maintenance state determining part 13, abnormality information sending part 14 and incident information receiving part 15. Each of these parts is materialized by a process, which is performed by the CPU 104 executing a program installed in the device management apparatus 10. Additionally, the device management apparatus 10 uses a device state history storing part 16. The device state history storing part 16 can be materialized by using, for example, the auxiliary storage device 102 or a storage device connected to the device management apparatus 10 through the network.

The device information collecting part 11 collects or receives the device information from each of the devices 40 registered as objects to be managed (management targets). The collection of the device information is performed by repeatedly (periodically) sending an acquisition request of the device information from the device information collecting part 11 to each of the devices 40. Additionally, if an abnormality occurs in the device 40, the device 40 may actively send the device information to the device information collecting part 11. The device information collecting part 11 stores the operation information, which is included in the collected or received device information, in the device state history storing part 16.

The assets information acquiring part 12 acquires the assets information regarding the device 40, from which the device information is collected, from the assets management apparatus 20.

The maintenance state determining part 13 determines a state of the device 40 (hereinafter, referred to as the "maintenance state") from a viewpoint of maintenance responsibility according to a contract such as a service level agreement (SLA). The determination is made based on the assets state indicated by the assets information acquired by the assets information acquiring part 12. The maintenance state is classified into "normal (maintenance target)", "abnormal (maintenance target)", "normal (other than maintenance target)" and "abnormal (other than maintenance target)". Here, the "normal (maintenance target)" designates a state where the operating state is normal and the assets state indicates a state where a vendor or maintenance company has a maintenance responsibility (hereinafter, referred to as the "state having a maintenance responsibility". The "abnormal (maintenance target)" designates a state where the operating state is abnormal and the assets state indicates the state having a maintenance responsibility. The "normal (other than maintenance target)" designates a state where the operating state is normal and the assets state indicates a state where a vendor or maintenance company does not have a maintenance responsibility. (hereinafter, referred to as the "state having no maintenance responsibility"). The "abnormal (other than maintenance target)" designates a state where the operating state is abnormal and the assets state indicates the state having no maintenance responsibility.

In the present embodiment, it is assumed that the usable state from among the states included in the assets state is the state having a maintenance responsibility. The device 40 in the usable state is in the assets state where the device 40 is usable by a user, and it is considered that, in such assets state, an abnormality in the operating state of the device 40 gives inconvenience directly to the user. On the other hand, those states other than the usable state are states where a user cannot use the device 40, and it is considered that an operating state in such a state other than the usable state is not a direct cause for the inconvenience given to the user. Thus, the assets state other than the usable state is assumed to be the state having no maintenance responsibility. However, which assets state is rendered to be the state having a maintenance responsibility may be appropriately defined in a contract such as a service level agreement (SLA).

The maintenance state determining part 13 stores information indicating a maintenance state which is a result of the determination (hereinafter, referred to as the "maintenance state information") and the assets information used for the determination in the device state history storing part 16 by associating with the operation information of the device 40 which is a target for the determination.

Accordingly, the operation information, assets information and maintenance state information of the device 40 are stored in the device state history storing part 16 each time the device information of the device 40 is collected.

The abnormal information sending part 14 sends information indicating an abnormal state of the device 40 (hereinafter, referred to as the "abnormality information" contained in the device information collected or received by the device information collecting part 11 to the abnormality information receiving part 31 of the incident management apparatus 30. The incident information receiving part 15 receives the incident information of the device 40 from the incident management apparatus 30. As an example of information received by the incident information receiving part 15, there is information indicating elimination of an abnormal state or restoration from an abnormal state with respect to the device 40 for which the abnormality information is notified by the abnormality information sending part 14. Note that the address information with respect to the abnormality information receiving part 31 of the incident management apparatus 30 is, for example, previously stored in the device management apparatus 10.

The assets management apparatus 20 includes an updating part 21, searching part 22, check necessity determining part 23 and check request outputting part 24. These parts are materialized by programs installed in the assets management apparatus 20 being executed by the CPU of the assets management apparatus 20. The assets management apparatus 20 uses an assets information storing part 25, an allowable period storing part 26 and an output condition storing part 27. These storing parts can be materialized by an auxiliary storage device of the assets management apparatus 20 or a storage device or the like connected to the assets management apparatus 20 thorough the network.

The updating part 21 updates the assets information stored in the assets information storing part 25. A process by the updating part 21 is performed, when the asset state of the device 40 is changed, in response to an input from a user to reflect the change in the assets information storing part 25.

The searching part 22 searches for the assets information conforming to a designated condition from the assets information storing part 25.

The check necessity determining part 23 determines, in response to an acquisition request of the assets information made by the device management apparatus 10, whether a check by a user is necessary with respect to the correctness of the assets information concerning the acquisition request. For example, if there is a possibility that the assets information is erroneous, it is determined that a check by a user is necessary. The determination is made by referring to the allowable period storing part 26. The allowable period storing part 26 stores an allowable period for the duration of an operating state for each operating state belonging to the abnormal state. The check necessity determining part 23 determines that a check by a user is necessary with respect to the device 40 of which an operating state, which is not a normal operating state, lasts beyond the end of an allowable period despite that the assets state indicates the state having a maintenance responsibility. The check necessity determining part 23 also acquires the assets information concerning the acquisition request through the searching part 22, and returns the acquired assets information to the device management apparatus 10.

If the check necessity determining part 23 determines that it is necessary to check the assets information, the check request outputting part 24 outputs a check request for the assets information to, for example, the client apparatus 50. The output condition storing part 27 stores information for limiting the check request to be output. That is, the check request based on the result of determination by the check necessity determining part 23 is subjected to filtering based on the information in the output condition storing part 27.

The incident management apparatus 30 includes the abnormality information receiving part 31, incident information sending part 32 and incident information inputting part 33. These parts are materialized by programs installed in the incident management apparatus 30 being executed by the CPU of the incident management apparatus 30. The incident management apparatus also uses an incident information storing part 34. The incident information storing part 34 can be materialized by the auxiliary storage device of the incident management apparatus 30 or a storage device or the like connected to the incident management apparatus 30 through the network.

The abnormality information receiving part 31 receives the abnormality information sent from the abnormality information sending part 14, and stores the abnormality information in the incident information storing part 34. By the abnormality information being stored in the incident information storing part 34, for example, a customer engineer or the like is notified of an occurrence of an abnormality of the device 40 according to a predetermined work flow system.

The incident information inputting part 33 receives information indicating the elimination of an abnormality (hereinafter, referred to as the "abnormality elimination information") from a customer engineer who has performed a restoration work for the device 40, which was in an abnormal state, or an operator who received a notification from the customer engineer. The incident information input part 33 may receive an input of the abnormality elimination information through an input device of the incident management device, or may receive the abnormality elimination information input to other devices through the network. The abnormality elimination information input by the incident information inputting part 33 is stored in the incident information storing part 34.

The incident information sending part 32 sends the abnormality information received by the incident information inputting part 33 to the incident information receiving part 15 of the device management apparatus 10. Note that the address information with respect to the incident information receiving part 15 of the device management apparatus 10 is, for example, previously stored in the incident management apparatus 30.

A description is given below of a process performed by the information processing system 1. FIG. 4 is a sequence chart of a process performed by the device management apparatus 10 and the assets management apparatus 20.

The device information collecting part 11 periodically collects the device information from each of the device 40 (steps S101 and S102), and stores the collected device information in the device state history storing part 16 (step S103). Hereinafter, the device 40 from which the device information is collected is referred to as the "device A".

FIG. 5 is an illustration indicating a structure of the device state history storing part 16. In FIG. 5, for the sake of convenience, records regarding one of the device 40 (device A) are illustrated. Note that the device state history storing part 16 may include a table as illustrated in FIG. 5 for each of the devices 40, or may include a single table as illustrated in FIG. 5 so that records regarding each device 40 are stored in the single table.

In FIG. 5, the records stored in the device state history storing part 16 include items such as date and time, operating state, assets information, maintenance state, etc. The item of date and time indicates a date and time at which the device information is collected or received from the device A. The item of operating state indicates an operating state indicated by the operation information contained in the device information. The item of assets state indicates the assets state indicated by the assets information of the device A at the time when the device information is collected or received. The item of maintenance state indicates the maintenance state of the device A.

In FIG. 5, the last record indicates the record registered in step S103. That is, in the process of step S103, a new record is added and the date and time and the operating state of the added record are stored in the table. In FIG. 5, an example in which a time interval for collecting the device information is three (3) hours (that is, a time interval between the date and time of consecutive records is three (3) hours) is indicated. The time interval for collecting the device information may be any period other than three (3) hours.

The operating state of each record is handled as it has been continued from the date and time of the record to the date and time of a next record. In other words, the record stored in step S103 (hereinafter, referred to as the "record A") corresponds to an example of information indicating that an operating state of a previous record (hereinafter, referred to as the "record B") preceding the record A lasts from the date and time of the record B until the date and time of the record A.

From among the constitutional elements of the device information, the constitutional elements other than the operation information may be stored in the device state history storing part 16. For example, each piece of the device information includes identification information of the device 40 (hereinafter, referred to as the "device ID"). The device ID may be a serial number, MAC address, IP address or the like which can identify each of the devices 40. Accordingly, the device information collecting part 11 can determine which piece of the device information corresponds to which of the device 40. Alternatively, if an inquiry of the device information and a response to the inquiry are performed synchronously, the device information collecting part 11 can determine the device 40, which makes the inquiry, as the device 40 concerning the collected device information.

The process of the following steps is performed by each device 40 from which the device information is collected. A description is given below on the assumption that the device A is a processing target (an object to be processed).

Subsequent to step S103, the device information collecting part 11 requests the maintenance state determining part 13 to determine the maintenance state of the device A at the present time (step S104). The device ID and the history of the device state information are specified in the request. The history of the device information of the device A corresponds to, for example, N pieces of records retroactively counting from the latest record or pieces of records for the latest M days with respect to the device A stored in the device state history storing part 16.

Subsequently, the maintenance state determining part 13 designates the device ID and the history of the device information of the device A, and requests the assets information acquiring part 12 to acquire the assets information of the device A (step S105). The assets information acquiring part 12 designates the device ID and the history of the device information of the device A, and sends an acquisition request for the assets information of the device A to the check necessity determining part 23 of the assets management apparatus 20 (step S106). Subsequently, the check necessity determining part 23 designates the device ID of the device A, and request the searching part 22 to acquire the assets information concerning the device ID (step S107).

The searching part 22 searches for the assets information associated with the device ID from the assets information storing part 25 (steps S108 and S109).

FIG. 6 is an illustration of a first example of a result of the search for the assets information by the searching part 22. In FIG. 6, an example in which the history of the assets information of the device A is searched for is illustrated. That is, the search result illustrated in FIG. 6 is based on the assumption that the assets information storing part 25 stores changes in the history of the assets state for each device 40. For example, at each time the assets state is updated, a new record is created in the assets information storing part 25, and the assets state after the updating is stored in the created record. Each record contains a date and time and assets state. The date and time indicates a date and time of updating the assets state. The assets state is the assets state after the updating.

If the process of step S104 is performed with respect to the device information for each time the device information is collected as is in the present embodiment, a single record concerning the latest assets state may be rendered as an object that is to be searched. On the other hand, if the process of step S104 and the subsequent steps is performed in a batch processing manner, that is, if the items of the assets state and the maintenance target of a plurality of records with respect to the same device 40 in the device state history storing part 16 are collectively recorded, the search result containing the history of the assets information in the past as illustrated in FIG. 6 is preferable. This is because the assets information corresponding to the past operating state can be identified by the history of the past assets information being contained in the search result.

Subsequently, the check necessity determining part 23 determines whether a check by a user is necessary with respect to the correctness of the asset information by collating the history of the assets information of the device A and the history of the device state information of the device A (step S111).

If it is determined that the check is necessary, the check necessity determining part 23 notifies the check request outputting part 24 of a check request for the assets information (step S112). The check request outputting part 24 acquires the output condition from the output condition storing part 27 (steps S113 and S114), and determines whether the contents of the check request conform to the output condition. If the contents of the check request conform to the output condition, the check request outputting part 24 outputs the check request to the previously set output destination (step S115). In FIG. 4, an example where the check request is sent to the client apparatus 50 is illustrated. The user can check the correctness of the assets information by checking the check request. As a result, the user can correct an error in the assets information.

Subsequently, the check necessity determining part 23 returns the history of the assets information of the device A to the assets information acquiring part 12 (step S116). The assets information acquiring part 12 returns the history of the assets information of the device A to the maintenance state determining part 13 (step S117).

Then, the maintenance state determining part 13 determines the maintenance state of the device A based on the assets state indicated by the assets information corresponding to the present time (hereinafter, referred to as the "target assets information") contained in the history of the assets information (step S118). The assets information corresponding the present time is the latest assets information having the date and time earlier than the present time in the history of the assets information. Note that the duration of each assets state is defined as a period from the date and time of the assets state until the date and time of the next assets state.

If only the latest assets information is acquired, the assets information corresponds to the target assets information. Additionally, if the process of step S104 and subsequent steps is performed in a batch processing manner, that is, if the items of the assets state and the maintenance target of a plurality of records with respect to the same device 40 in the device state history storing part 16 are collectively recorded, the target assets information may differ for each record. Thus, the assets state where the date and time of each record is contained in the duration of the assets state, that is, the latest (or last) assets information at the date and time of each record is rendered to be the target assets information for each record.

Subsequently, the maintenance state determining part 13 stores the assets state indicated by the target assets information and the maintenance state indicated by the maintenance state information, which is a determination result, in the record corresponding to the target assets information and the determination result (for example, the last record in FIG. 5) in the device state history storing part 16 (step S119).

A description will be given below of details of the step S118. FIG. 7 is a flowchart of a determination process of determining a maintenance state. In the process of FIG. 7, the record rendered to be a processing target in the device state history storing part 16 (for example, the last record in FIG. 5) is referred to as the "target record".

In step S201, the maintenance state determining part 13 determines whether the assets information is acquired. That is, it is determined whether the history of the assets information input in step S117 is not empty. Note that, for example, if the assets information regarding the device A is not stored in the assets information storing part 25, the history is empty.

If the assets information is not acquired (NO in step S201), it is not possible to determine the maintenance state. Thus, the maintenance state determining part 13 ends the process of FIG. 7. In this case, the assets state and maintenance state is not stored in the target record of the device state history storing part 16.

If the assets information is acquired (YES in step S201), the maintenance determining part 13 determines whether the operating state of the target record is other than normal, that is, whether the operating state is an abnormal state (step S202). If the operating state is other than normal (YES in step S202), the maintenance state determining part 13 determines whether the assets state indicated by the target assets information is the usable state (step S203). If the assets state is the usable state (YES in step S203), the maintenance state determining part 13 determines that the maintenance state with respect to the target record is abnormal (maintenance target) (step S204). If the assets state is not the usable state (NO in step S203), the maintenance state determining part 13 determines that the maintenance state with respect to the target record is abnormal (other than maintenance target) (step S205).

On the other hand, if the operating state of the target record is normal (NO in step S202), the maintenance state determining part 13 determines whether the assets state indicated by the target assets information is the usable state (step S206). If the assets state is the usable state (YES in step S206), the maintenance state determining part 13 determines that the maintenance state with respect to the target record is normal (maintenance target) (step S207). If the assets state is not the usable state (NO in step S206), the maintenance state determining part 13 determines that the maintenance state with respect to the target record is normal (other than maintenance target) (step S208).

Due to the maintenance state determined in the process of FIG. 7 and the assets state indicated by the target assets information being stored in the target record, the contents of information stored in the device state history storing part 16 becomes that illustrated in FIG. 8.

FIG. 8 is an illustration of a first example of the assets state and maintenance state stored in the device state history storing part 16. In this case, the last record in FIG. 6 is set as the target record. FIG. 8 illustrates the assets state and maintenance state stored in the device state history storing part 16, when the last assets information from among the history of the assets information illustrated in FIG. 6 is the target assets information. In this case, the operating state is other than normal, and the assets state indicated by the target assets information is the usable state. Accordingly, the maintenance state is set as abnormal (maintenance target).

Moreover, if the search result for the assets information of the device A is that illustrated in FIG. 9, the contents of information stored in the device state history storing part 16 become that illustrated in FIG. 10. FIG. 9 is an illustration of a second example of the search result of the assets information. The search result illustrated in FIG. 9 differs from that illustrated in FIG. 6 in that the assets state indicated by the target assets information is the moving state. In this case, the maintenance state and assets state indicated by the target assets information are stored in the device state history storing part 16 as illustrated in FIG. 10.

FIG. 10 is an illustration of a second example of the assets state and maintenance state with respect to the device state history storing part 16. In the example of FIG. 10, the maintenance state of the last record is set as abnormal (other than maintenance target). It is set as other than maintenance target because the assets state is other than the usable state.

The target for comparison with the assets state indicated by the target assets information in the process of step S203 of FIG. 7 is not fixed to the operating state, and other states may be set as the target for comparison. For example, a list of assets states having a maintenance responsibility or no maintenance responsibility may be stored in the auxiliary storage device 102. The maintenance state determining part 13 may determine whether the assets state indicated by the target assets information corresponds to any one of the states contained in the list stored in the auxiliary storage device 102.

According to the device state history storing part 16 as illustrated in FIG. 8 or FIG. 10, the operation information during the period where there is no maintenance responsibility can be eliminated from information for calculating the operation rate. That is, the period where there is no maintenance responsibility given to the vender or maintenance company can be eliminated from the calculation period for calculating the operation rate of the device A. Specifically, the period during which the maintenance state is normal (other than maintenance target) or abnormal (other than maintenance target) can be removed from MTBF or MTTR in the formula (1). As a result, according to the contract such as a service level agreement (SLA), an appropriateness or validity of the result of the calculation of the operation rate can be improved.

Figure 11:
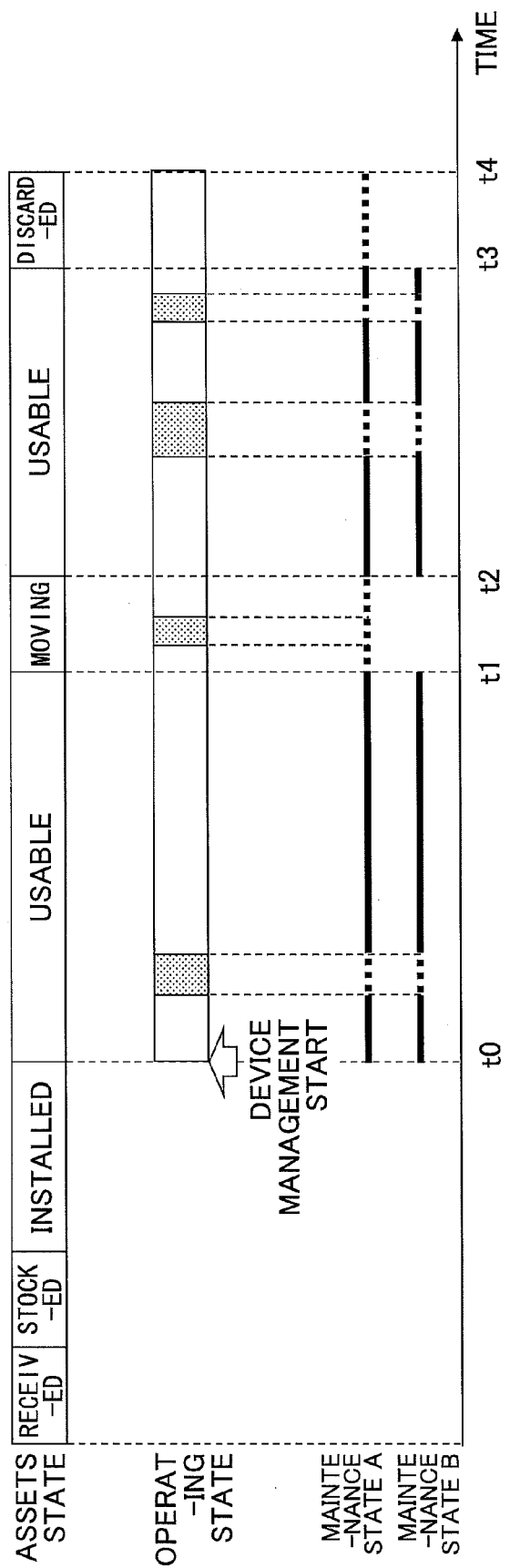
FIG. 11 is an illustration indicating a maintenance state of a device.

FIG. 11 is an illustration of a transition of a maintenance state with respect to the passage of time. In FIG. 11, the horizontal axis represents the passage of time, and time passes along the horizontal axis from the left to the right. The assets state, operating state, maintenance state A and maintenance state B are arranged on the vertical axis.

In an elongated rectangular area indicating the operating state, shaded portions represent a state other than the normal state and blank portions without shading represent the normal state. In the example of FIG. 11, the assets state transits to the usable state at time t0, and collection of the device information by the device management apparatus 10 is started at time t0. Accordingly, the operating state is rendered to be effective from time t0.

The maintenance state A indicates transition of the maintenance state when the present embodiment is not applied, that is, when the maintenance state is determined without consideration of the assets state. The maintenance state B indicates transition of the maintenance state when the present embodiment is applied, that is, when the maintenance state is determined with consideration of the assets state.

In the transition of the maintenance state, bold solid lines indicate durations of normal (maintenance target), and bold dashed lines indicate durations of abnormal (maintenance target). Moreover, blank portions without lines indicate durations of normal (other than maintenance target) or abnormal (other than maintenance target). According to the maintenance state A, the entire period after time t0 is a period during which a vender or maintenance company has a maintenance responsibility under the service level agreement (SLA). That is, the entire period is set as a period for calculating the operation rate (a period contributing to the calculation of the operation rate). On the other hand, according to the maintenance period B, the period from time t1 to time t2 and the period from time t3 to time t4 are excluded from the period for calculating the operation rate.

If the operation rate is calculated based on the example illustrated in FIG. 8 or FIG. 10, the period of each operating state is set as a period from the date and time of an operating state to the date and time of the subsequent operating state. For example, the cover open state, which is the operating state of the record on the second horizontal row in FIG. 8 or FIG. 10, may be considered as continuing from the date and time of the record to the date and time of the subsequent record.

Figure 12:
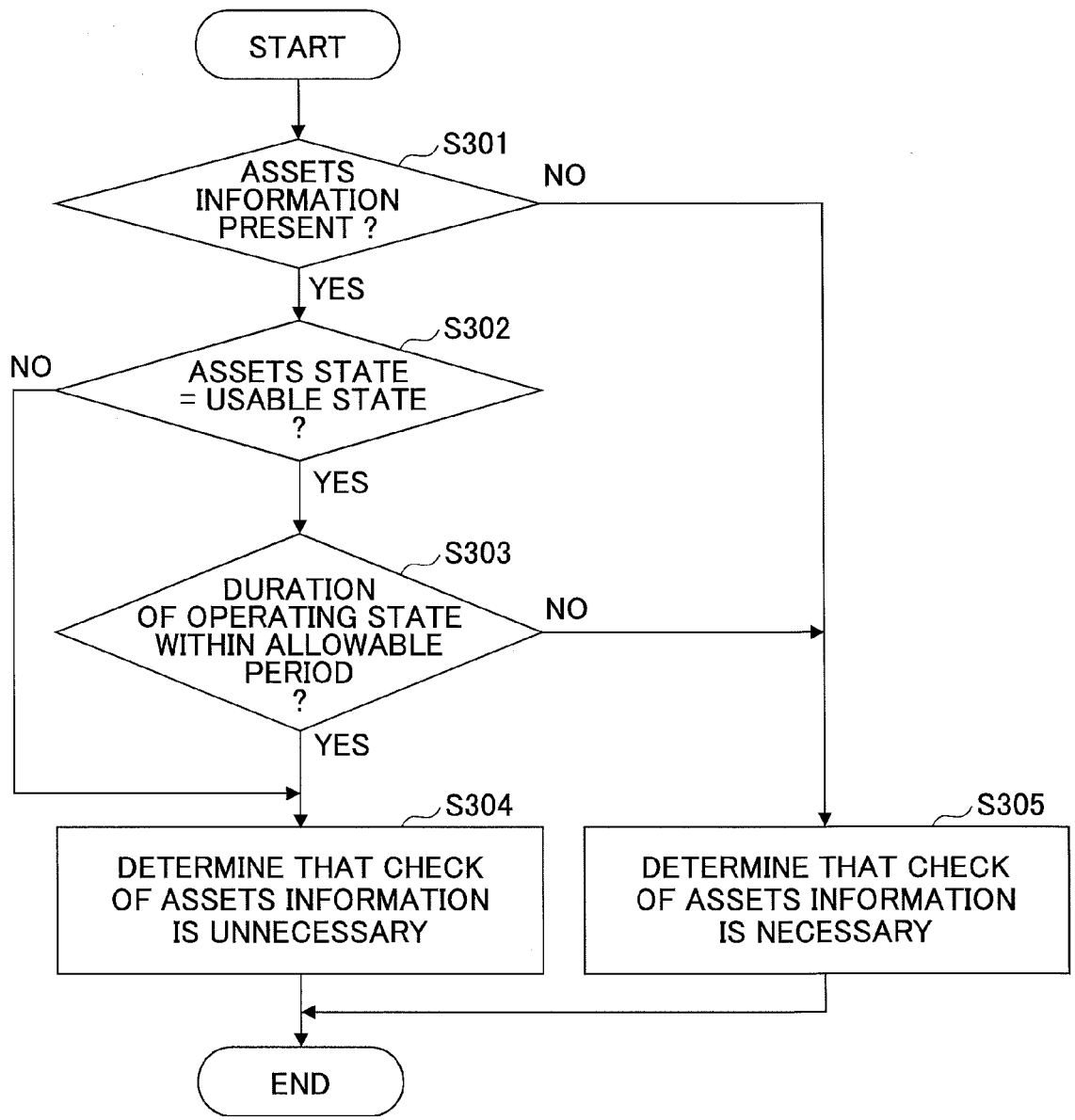
FIG. 12 is a flowchart of a process of determining necessity of checking the assets information.

Next, a description is given of details of the process of step S111 of FIG. 4. FIG. 12 is a flowchart of a check necessity determination process for the assets information.

In step S301, the check necessity determining part 23 determines whether the assets information of the device A is acquired. If the assets information is acquired (YES in step S301), the check necessity determining part 23 determines whether the assets state indicated by the latest assets information is the usable state in the history of the assets information (step S302). If the assets state is the usable state (YES in step S302), the check necessity determining part 23 refers to the history of the device information and determines whether the duration of the operating state indicated by the operation information contained in the latest device information by referring to the allowable period storing part 26 (S303).

Figures 13, 14:
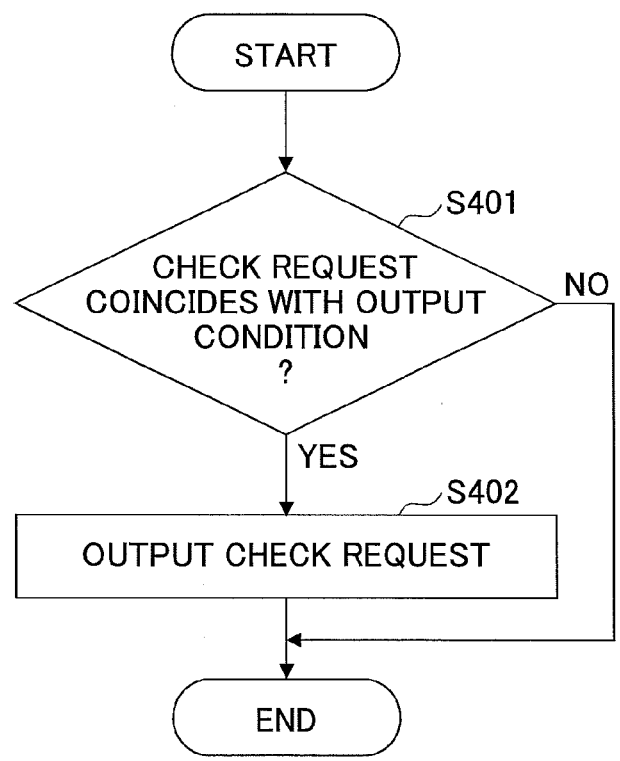
FIG. 13 is an illustration of a structure of an allowable period storing part.
FIG. 14 is a flowchart of a process of outputting a check request.

FIG. 13 is an illustration of a configuration of the allowable period storing part 26. As illustrated in FIG. 13, the allowable period storing part 26 stores the allowable period for each operating state which is not normal. The allowable period may be set based on the contract such as a service level agreement (SLA), or a period which is generally needed to eliminate each operating state may be set as the allowable period.

If the duration of the latest operating state is within the allowable period (YES in step S303), the check necessity determining part 23 determines that checking the assets information is unnecessary (step S304). Also, if the assets state is not the usable state (NO in step S302), the check necessity determining part 23 determines that checking the assets information is unnecessary (step S304).

On the other hand, if the duration exceeds the allowable period (NO in step S303), the check necessity determining part 23 determines that checking the assets information is necessary (step S305). This is because there may be a possibility that the device A is not actually in the usable state because an abnormal state lasts beyond the allowable period despite that the device A is in the usable state. Also, if the assets information of the device A is not present (NO in step S301), the check necessity determining part 23 determines that checking the assets is necessary (step S305).

In the process of FIG. 12, if it is determined that checking the assets information is unnecessary, the process of steps S112 through S115 in FIG. 4 is not performed. If it is determined that checking the assets information is necessary, the check request outputting part 24 is notified of a check request containing the assets information and the operation information indicating the latest operating state of the device A. Note that if it is determined that checking the assets information is necessary because the assets information of the device A is not present, the check request outputting part 24 is notified of a check request containing the device ID of the device A and information indicating that the assets information of the device A is not present.

Although the check request is made only in the case where the assets state is the usable state in the process illustrated in FIG. 12, it may be determined whether it is inconsistent with respect to a combination of the assets state and the operating state so that the check request is made when there is an inconsistency. Information indicating a combination having an inconsistency may be stored in the auxiliary storage device 102. That is, in a case including the case explained above with reference to the flowchart, the check request may be made based on whether the assets state and the usable state have a predetermined relationship.

Next, a description is given of details of the process of step S115 of FIG. 4. FIG. 14 is a flowchart of a process of outputting the check request.

In step S401, the check request outputting part 24 determines whether the cause of the check request notified by the check request determining part 23 corresponds to one of the output conditions stored in the output condition storing part 27.

Figure 15:
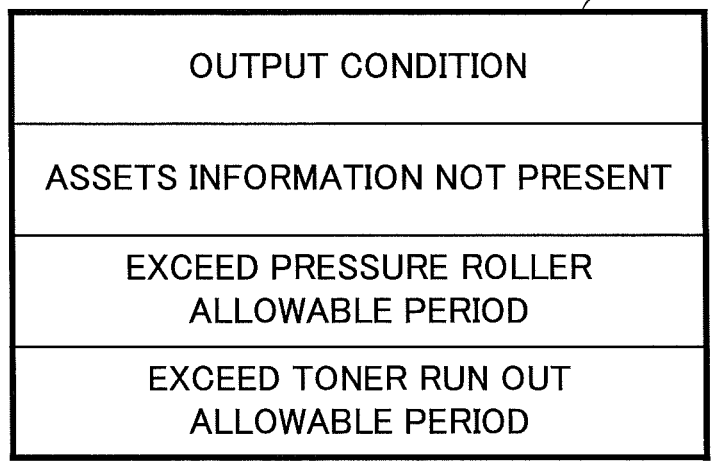
FIG. 15 is an illustration of a configuration of an output condition storing part.

FIG. 15 is an illustration of a configuration of the output condition storing part 27. As illustrated in FIG. 15, the output condition storing part 27 stores information for limiting the check request of which notification is sent to a user. In FIG. 15, the output condition includes information regarding causes for making a check request, that is, information indicating that the assets information is not present, information indicating that a period of a pressure roller malfunctioning state exceeds an allowable period, or information indicating that a period of a toner running out state exceeds an allowable period. Accordingly, if the cause for making the check request is that a period of a cover open state exceeds an allowable period, it is determined that the cause for making the check request does not corresponds to the output condition.

If the cause of the check request corresponds to the output condition (YES in step S401), the check request outputting part 24 outputs the check request according to a previously set outputting method such as, for example, transmitting electronic mail or writing in the Web site (step S402). On the other hand, if the cause of the check request does not correspond to the output condition (NO in step S401), the check request is not made.

By filtering the check request using the output condition, a check request unnecessary for a user can be prevented from being output.

Figure 16:
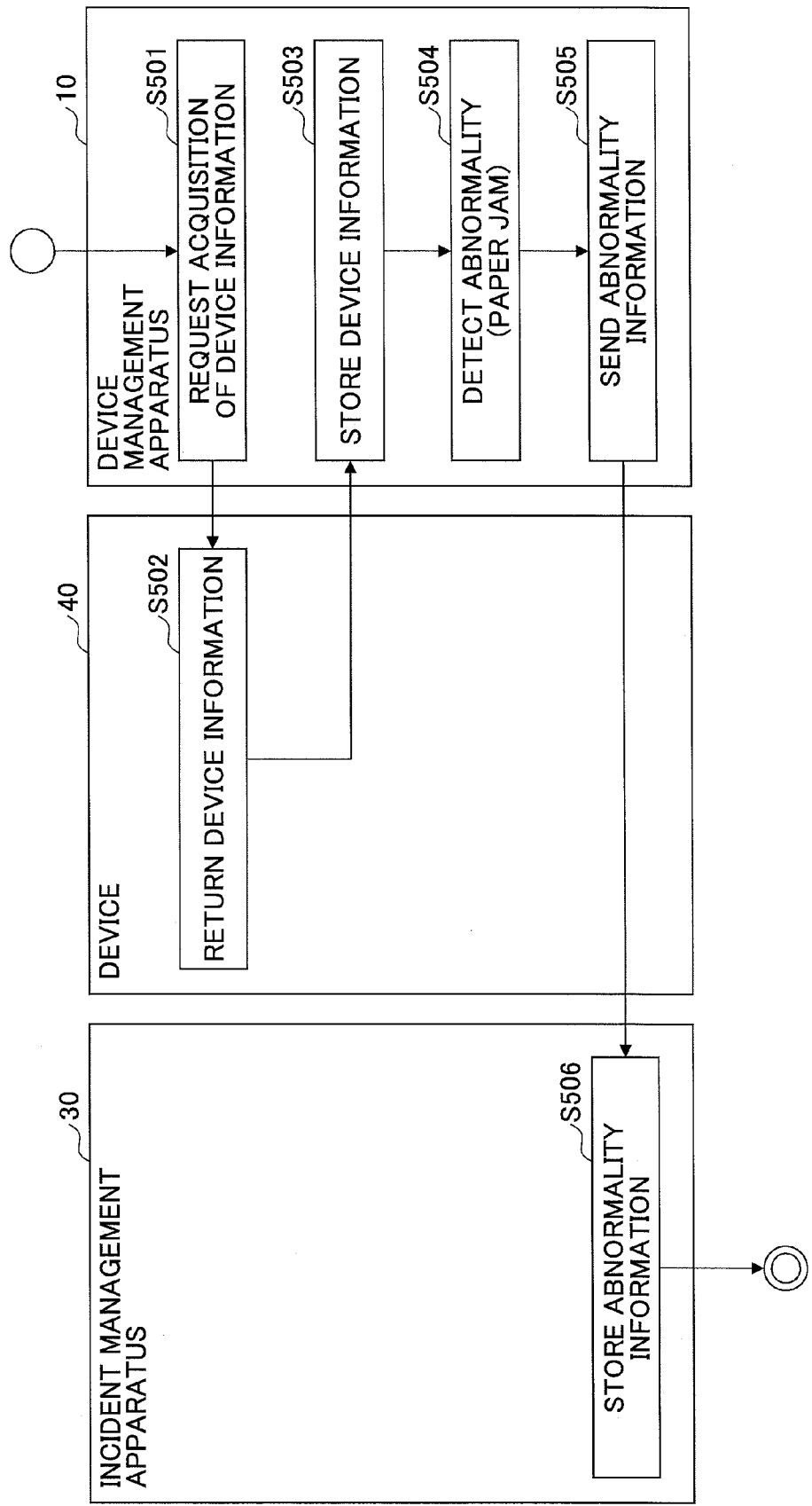
FIG. 16 is a flowchart of a process performed in a state where a device is in an abnormal state.

Next, a description is given of a process performed by the device management apparatus 10 and the incident management apparatus 30. FIG. 16 is a flowchart of a process performed, when an abnormal state occurs in the device 40, between the device management apparatus 10 and the incident management apparatus 30.

The device information collecting part 11 of the device management apparatus 10 sends an acquisition request for the device information to each device 40 at a predetermined time interval (step S501). In response to the acquisition request, the device 40 returns a response including the device information to the device information collecting part 11. The device information collecting part 11 stores the device information included in the returned response in the device state history storing part 16 (step S503).

If the operating state indicated by the newly stored device information is other than normal (for example, if it is "paper jam"), the abnormality information sending part 14 of the device management apparatus 10 detects an occurrence of abnormality with respect to the device 40, which is a sender of the device information (step S504). Thus, the abnormality information sending part 14 of the device management apparatus 10 sends the abnormality information indicating the operating state to the incident management apparatus 30 (step S505).

Upon reception of the abnormality information, the abnormality information receiving part 31 of the incident management apparatus 30 stores the abnormality information in the incident information storing part 34 (step S506).

The process of steps S501 through S503 is the same as the process of steps S101 through S103. That is, if the device information stored in the step S103 of FIG. 4 indicates an abnormal state, the process of step S504 and the subsequent steps is performed.

Next, a description is given of a process performed when the abnormal state is eliminated with respect to the device 40 for which the abnormality information is stored in the incident information storing part 34.

Figure 17:
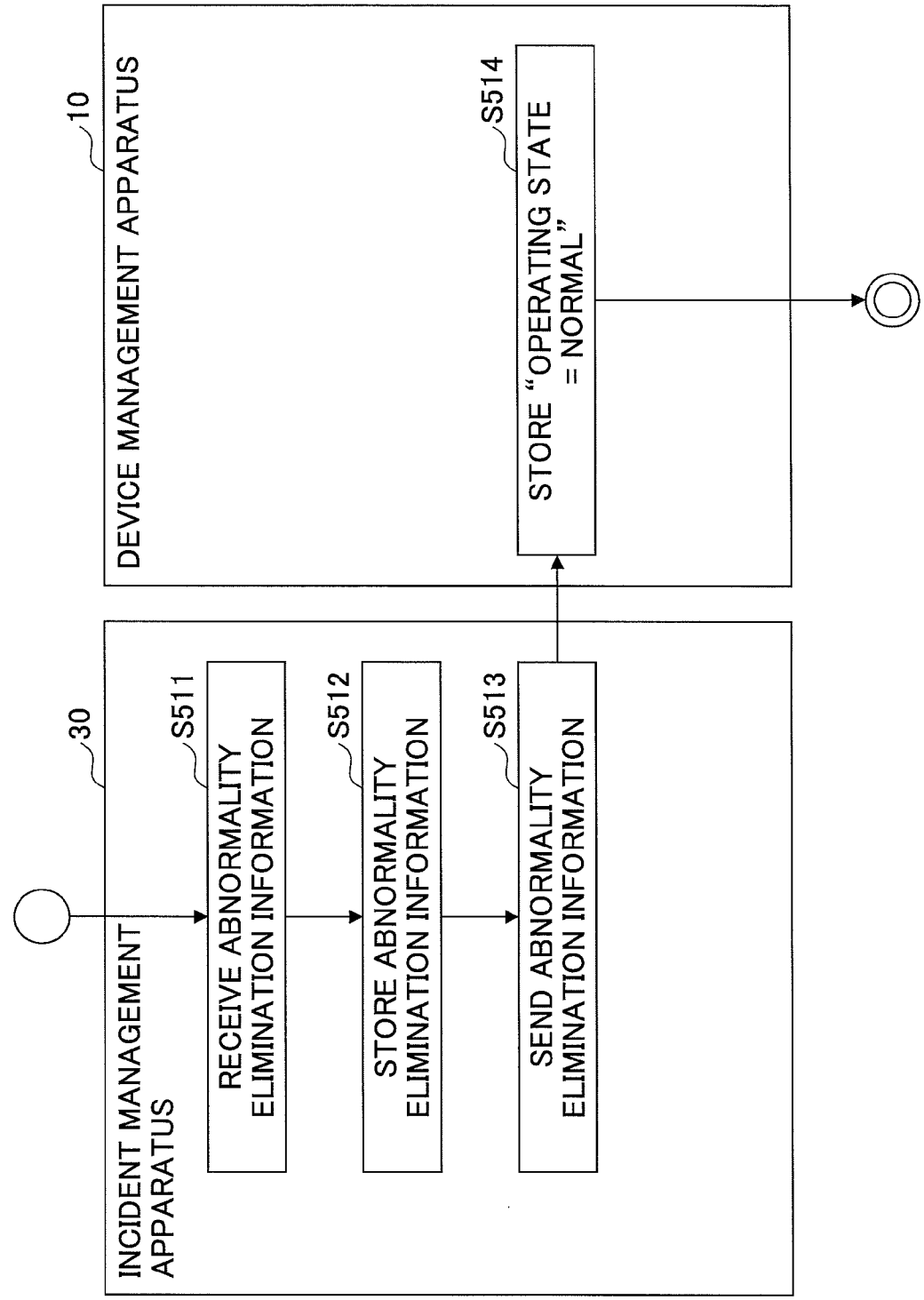
FIG. 17 is a flowchart of a process performed in a state where the abnormality in the device is eliminated.

FIG. 17 is a flowchart of a process performed by the device management apparatus 10 and the incident management apparatus 30 when the abnormal state of the device 40 is eliminated.

For example, a customer engineer performs a restoring operation for the device 40, which is in the abnormal state indicated by the abnormality information stored in the incident information storing part 34 in step S506 of FIG. 16. If the abnormal state is eliminated as a result of the restoring operation, the customer engineer or operator inputs abnormality elimination information to the incident management apparatus 30. In this respect, rapidly inputting the abnormality elimination information after the completion of the restoring operation can enhance the effects obtained by the present embodiment.

Then, the incident information input part 33 of the incident management apparatus 30 receives the input of the abnormality elimination information (step S512).

Subsequently, the incident information input part 33 stores the abnormality elimination information in the incident information storing part (step S512). For example, information indicating that a response to the abnormal state indicated by the abnormality information stored in step S506 is completed may be stored in the incident information storing part.

Subsequently, the incident information sending part 32 of the incident management apparatus 30 sends the abnormality elimination information to the device management apparatus 10 (step S513). Upon reception of the abnormality elimination information, the incident information receiving part 15 of the device management apparatus 10 stores (adds) the record of which a value of the operating state is normal in the device state history storing part 16 (S514).

FIG. 18 is an illustration of adding a record to the device state history storing part 16 based on the abnormality elimination information. In FIG. 18, the record registered based on the abnormality elimination information input to the incident management apparatus 30 in response to the elimination of a paper jam is indicated at a position subsequent to the last record in FIG. 5 or FIG. 8.

The date and time of the record indicates a time when the record is registered. Here, records other than the last record are registered at a time interval of three (3) hours. Accordingly, if the process of FIG. 17 is not performed, the fact that the device 40 is in the normal state is confirmed at a time as late as "2013/04/09 09:00:00".

On the other hand, the date and time of the record "2013/04/09 07:10:00" registered by the process of FIG. 17 does not follow the time interval of three (3) hours. This is because the input of the abnormality elimination information into the incident management apparatus 30 is performed in asynchronization with a time interval for collecting the device information. As a result, information indicating that the duration of the abnormal state is one (1) hour and ten (10) minutes is stored in the device state history storing part 16. That is, the record added by the process of step S514 corresponds to an example of information indicating that the operating state and maintenance state of the record (hereinafter, referred to as the "record B") preceding the record to be added (hereinafter, referred to as the "record A") last for a period from the date and time of the record B to the date and time of the record A.

According to the example of FIG. 18, the period counted as the period of the abnormal state can be reduced by one (1) hour and fifty (50) minutes. That is, the mean time between failures (MTBF) of the device 40 can be increased, and, thereby, the operation rate can be increased. It is considered that the increased operation rate is more practical.

Figure 19:
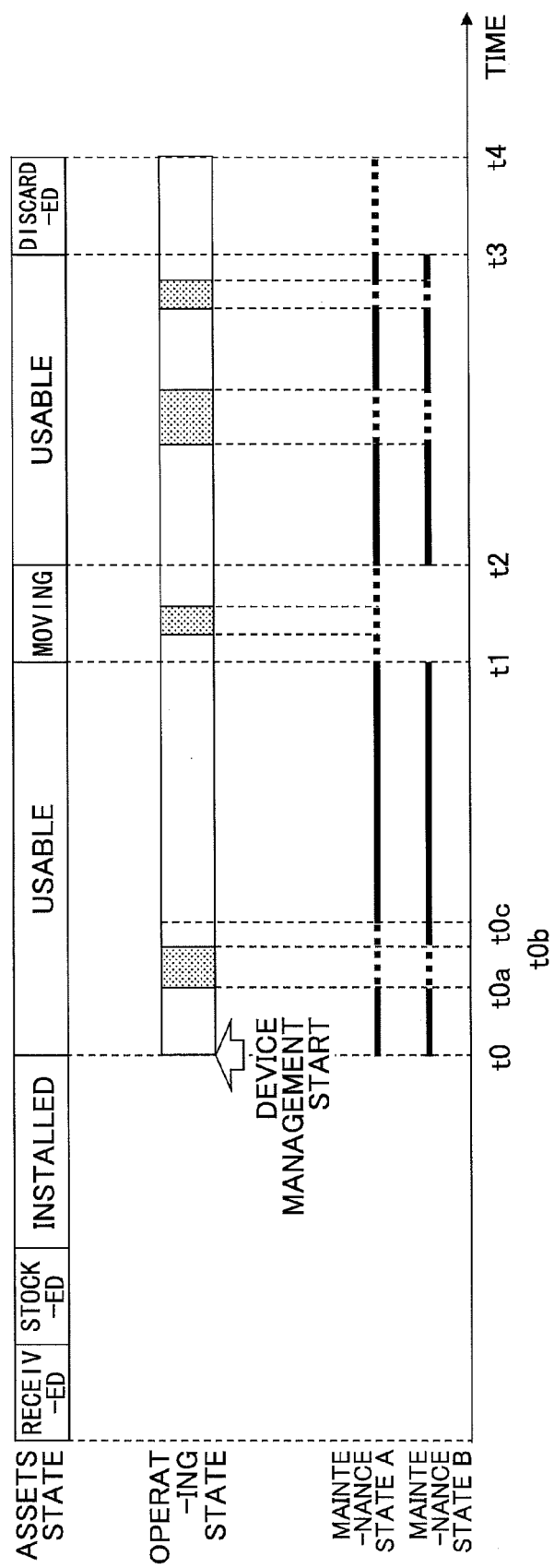
FIG. 19 is an illustration of a maintenance state of a device.

A description is given of this respect with reference to FIG. 19. FIG. 19 is an illustration of a second example of a transition of a maintenance state with respect to the passage of time. FIG. 19 illustrates a difference in the maintenance state between the case (maintenance state A) where the present embodiment is applied and the case (maintenance state B) where the present embodiment is not applied. Note that FIG. 19 should be interpreted in the same manner as FIG. 11.

In FIG. 19, time points t0a, t0b and t0c are additionally indicated. The time point t0a is the time when the device management apparatus 10 receives or collects the operation information indicating the abnormal state. The time point t0c is the time when the abnormality elimination information is input by the customer engineer. The time point t0c is the time to collect the device information subsequent to the time pint t0a according to the time interval for collection of the device information. When the process of FIG. 17 is not performed, a period from the time point t0a to the time point t0c corresponds to a duration of the abnormality (maintenance target) (hereinafter, referred to as the "period A". On the other hand, when the process of FIG. 17 is performed, a period from the time point t0a to the time point t0b corresponds to a duration of the abnormality (maintenance target) (hereinafter, referred to as the "period B". As apparent from FIG. 19, the period B is shorter than the period A.

By causing the notification of the abnormality information positively made by the device 40, the period of the abnormal state of the device 40 can be determined more accurately.

The assets state and maintenance state in the last record in FIG. 18 may be registered by the process of step S104 and subsequent steps being performed subsequent to the process of step S514.

In the meantime, even if an abnormality or failure does not occur in the device 40, a function maintenance operation (or maintenance work) such as an inspection is performed by a customer engineer in order to prevent an occurrence of an abnormality or failure to maintain the function of the device 40. How to deal with the period of the function maintenance operation in the calculation of the operation rate depends on the contract such as a service level agreement (SLA). If a contract is made to eliminate the period from the calculation of the operation rate, the information processing system 1 may perform the following process.

FIG. 20 is a flowchart of a process performed by the device management apparatus 10 and the incident management apparatus 30 at the time of starting the function maintenance operation.

First, the incident information inputting part 33 of the incident management apparatus 30 receives an input indicating a start of the function maintenance operation (step S601).

Subsequently, the incident information input part 33 stores information indicating a start of the function maintenance operation (hereinafter, referred to as the "function maintenance operation start information") in the incident information storing part 34 (step S602). Subsequently, the incident information sending part 32 of the incident management apparatus 30 sends the function maintenance operation start information to the device management apparatus 10 (step S603). Upon reception of the function maintenance operation start information, the incident information receiving part 15 of the device management apparatus 10 stores a record of which a value of the operating state corresponds to "function maintenance operation start" in the device state history storing part 16 (step S604).

After the function maintenance operation is ended, a process the same as the process of FIG. 20 is performed. However, at the time of ending the function maintenance operation, an input indicating the end of the function maintenance operation is supplied to the incident management apparatus 30. As a result, a record of which a value of the operating value corresponds to "function maintenance operation end" is stored in the device state history storing part 16.

FIG. 21 is an illustration of adding a record to the device state history storing part 16 based on the start and end of the function maintenance operation.

In FIG. 21, a record of which a value of the operating state corresponds to "function maintenance operation start" (hereinafter, referred to as the "operation start record") is stored at the fifth position from the bottom. Additionally, a record of which a value of the operating state corresponds to "function maintenance operation end" (hereinafter, referred to as the "operation end record") is stored at the second position from the bottom. The date and time of each of the operation start record and operation end record is the date and time at which each record is stored, which date and time is nearly equal to the date and time of starting or ending the function maintenance operation.

The process of FIG. 4 continues during the function maintenance operation. Accordingly, some records are stored between the operation start record and the operation end record. Here, the maintenance state of each record between the operation start record and the operation end record is normal (other than maintenance target) or abnormal (other than maintenance target), which is the state where a vender or maintenance company does not have a maintenance responsibility. When a record indicating a start or end of the function maintenance operation such as the operation start record and operation end record is stored in the device state history storing part 16, the maintenance state determining part 13 performs, for example, a process illustrated in FIG. 22 instead of the process illustrated in FIG. 7.

FIG. 22 is a flowchart of another process of determining the maintenance state. In FIG. 22, steps the same as the steps of FIG. 7 are given the same step numbers, and descriptions thereof will be omitted.

In the process of FIG. 22, step S211 is added after the determination result is YES in step S203, and step S212 is added after the determination result is YES in step S206.

In the process of steps S211 and S212, the maintenance state determining part 13 determines whether the operation start record is present without the operation end record to make a pair in the group of records preceding the record to be processed. The operation end record that makes a pair with the operation start record is an operation end record of which date and time is later than the date and time of the operation start record.

If the operation start record that makes a pair is present, the maintenance state determining part 13 performs the process of step S205 or S208. If the operation start record that makes a pair is not present, the maintenance state determining part performs the process of step S204 or S207.

As mentioned above, by setting each record between the function maintenance operation start record and the function maintenance operation end record to be other than maintenance target, the period of the function maintenance operation can be eliminated from the period for calculating the operation rate.

FIG. 23 is an illustration of a third example of a transition of a maintenance state with respect to the passage of time. FIG. 23 illustrates a difference in the maintenance state between the case (maintenance state A) where the present embodiment is applied and the case (maintenance state B) where the present embodiment is not applied.

In FIG. 23, a time point t2a is a start time of the function maintenance operation, and a time point t2d is an end time of the function maintenance operation. In this case, the operating state of the device 40 during the period from the time point t2a to the time point t2d is normal (other than maintenance target) or abnormal (other than maintenance target). Accordingly, the operation information during the period from t2a to t2d can be eliminated from information for calculating the operation rate. That is, the period from t2a to t2d can be eliminated from the period for calculating the operation rate. As a result, an abnormality that occurs due to the function maintenance operation (an abnormality assumed by the device management apparatus 10), such as cover opening, toner removal, etc., during the function maintenance operation, can be prevented from affecting the operation rate.

As mentioned above, according to the present embodiment, a record indicating elimination of an operating state indicating an abnormality is stored in the device state history storing part 16 based on the abnormality elimination information input to the incident management apparatus 30. As a result, the duration of the abnormality can be determined as a period nearly equal to the actual period. That is, an appropriateness of the operating state of the device 40 according to the information acquired from the device 40 can be improved.

It should be noted that the device 40 may actively send a notification of an occurrence of an abnormality to the device management apparatus 10. Similarly, the device 40 may actively send a notification of an elimination of an abnormality to the device management apparatus 10. However, it is considered that a communication state of the device 40 is rather stable as compared to the incident management apparatus 30. Specifically, the power of the device 40 may be switched ON/OFF by a user easily, and the device 40 can be disconnected from the network 60 easily. Additionally, there may be the device 40 which can actively send the notification of elimination of an abnormality or which cannot. In consideration of such a viewpoint, the information processing system according to the present embodiment is configured to store the record indicating elimination of an abnormality of the device 40 in the device state history storing part 16 based on the information input in the incident management apparatus 30.

Moreover, according to the present embodiment, the operation information during the period of the function maintenance operation with respect to the device 40 can be eliminated from the information used for calculating the operation rate of the device 40. That is, the period of the function maintenance operation can be removed from the period for calculating the operation rate of the device 40. Accordingly, the duration of the abnormal state that occurs in the function maintenance operation can be prevented from being handled as an abnormal period in the calculation of the operation rate.

Moreover, according to the present embodiment, a period during which a vender or maintenance company does not have a maintenance responsibility can be determined by using the assets information so as to eliminate the operation information in the period during which a vender or maintenance company does not have a maintenance responsibility from the information used for calculating the operation rate of the device 40. That is, the period during which a vendor or maintenance company does not have a maintenance responsibility can be removed from the period for calculating the operation rate of the device 40. Accordingly, an appropriateness of the result of the calculation of the operation rate can be improved.

Additionally, the assets information is not always used. That is, the assets management apparatus 20 is not necessarily included in the information processing system 1. In such a case, the item of the maintenance state is not necessary in the device state history storing part 16. Even if the assets information is not used, as mentioned above, it is capable of achieving the reduction of the period of abnormal state of the device 40 and the elimination of the function maintenance period of the device 40 from the period for calculating the operation rate.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitable programmed apparatuses such as a general purpose computer, personal digital assistant (PDA), mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as flexible magnetic disk, hard disc, CD-ROM, magnetic tape device or solid state memory device. The computer software can be provided to the programmable apparatus using any non-transient recording medium for recording processor readable code, such as a flexible magnetic disk, hard disk, CD-ROM, magnetic tape, solid-state memory, etc. The hardware platform encompasses any suitable hardware resources including, for example, a central processing unit (CPU), random access memory (RAM), hard disc drive (HDD), etc. The CPU can be configured by any suitable types and numbers of processors. The RAM can be configured by any suitable volatile or non-volatile memory. The HDD can be configured by any suitable non-volatile memory that can record a large amount of data. The hardware resources may further be equipped with an input device, output device or network device in conformity with the device type. The HDD may be provided outside the apparatus as long as it can be accessed. In such an example, the CPU and RAM like a cache memory of the CPU can serve as a physical memory or main memory of the apparatus, whereas the HDD can serve as a secondary memory of the apparatus.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus that calculates an operation rate of a device based on operation information, comprising a processor that is configured to execute a process including:
   receiving the operation information indicating an operating state of the device at a predetermined time interval from said device through a network;
   receiving assets information of the device through the network, said asset information indicating a status of the device as assets;
   storing the received operation information when the asset information indicates that the status of the device is a predetermined status in a first storing part; and
   calculating the operation rate based on information obtained by excluding the operation information that is stored when the asset information indicates that the status of the device is the predetermined status from information to be used to calculate the operation rate of the device,
   wherein the process further includes, with respect to said device from which the operation information indicating that the operating state is abnormal is received receiving elimination information indicating elimination of the abnormality in asynchronization with the predetermined time interval, said elimination information being input by a user in asynchronization with the predetermined time interval; and
   when the elimination information is received within a period from a reception of the operation information indicating that the operating state is abnormal and until a subsequent reception of the operation information, adding information to said first storing part, which indicates that the abnormality indicated by the operation information lasts from the reception of the operation information to the reception of the elimination information.

2. The information processing apparatus as claimed in claim 1, wherein the process further including:
   receiving an input indicating a start and end of a predetermined operation performed on said device; and
   determining an elimination of the operation information, which is received in a period from the start of the predetermined operation until the end of the predetermined operation, from information used for calculating an operation rate of said device.

3. The information processing apparatus as claimed in claim 1, wherein the operation information received within a period during which the assets information stored in a second storing part indicates a predetermined state is determined to be eliminated from the information used for calculating the operation rate irrespective of the operating state indicated by the operation information.

4. An information processing system, comprising a first information processing apparatus and a second information processing apparatus,
   wherein said first information processing apparatus calculates an operation rate of a device based on operation information and includes a processor that is configured to execute a process including:
   receiving the operation information indicating the operating state of the device at a predetermined time interval from said device through a network;
   receiving assets information of the device through the network, said asset information indicating a status of the device as assets;
   storing the received operation information when the asset information indicates that the status of the device is a predetermined status in a first storing part; and
   calculating the operation rate based on information obtained by excluding the operation information that is stored when the asset information indicates that the status of the device is the predetermined status from information to be used to calculate the operation rate of the device,
   wherein the process further includes, with respect to said device from which the operation information indicating that the operating state is abnormal is received, receiving elimination information indicating elimination of the abnormality in asynchronization with the predetermined time interval, said elimination information being input by a user in asynchronization with the predetermined time interval; and
   when the elimination information is received within a period from a reception of the operation information indicating that the operating state is abnormal and until a subsequent reception of the operation information, adding information to said first storing part, which indicates that the abnormality indicated by the operation information lasts from the reception of the operation information to the reception of the elimination information.

5. The information processing system as claimed in claim 4, wherein the process further including:
   receiving an input indicating a start and end of a predetermined operation performed on said device from said second information apparatus; and
   determining an elimination of the operation information, which is received in a period from the start of the predetermined operation until the end of the predetermined operation, from information used for calculating an operation rate of said device.

6. The information processing system as claimed in claim 4, wherein the operation information received within a period during which the assets information stored in a second storing part indicates a predetermined state is determined to be eliminated from the information used for calculating the operation rate irrespective of the operating state indicated by the operation information.

7. An information processing method performed by an information processing apparatus that calculates an operation rate of a device based on operation information, said information processing apparatus including a processor that is configured to execute the method, the information processing method including:
   receiving the operation information indicating the operating state of the device at a predetermined time interval from said device through a network;
   receiving assets information of the device through the network, said asset information indicating a status of the device as assets;
   storing the received operation information when the asset information indicates that the status of the device is a predetermined status in a first storing part; and
   calculating the operation rate based on information obtained by excluding the operation information that is stored when the asset information indicates that the status of the device is the predetermined status from information to be used to calculate the operation rate of the device, wherein the method further includes, with respect to said device from which the operation information indicating that the operating state is abnormal is received, receiving elimination information indicating elimination of the abnormality in asynchronization with the predetermined time interval, said elimination information being input by a user in asynchronization with the predetermined time interval; and when the elimination information is received within a period from a reception of the operation information indicating that the operating state is abnormal and until a subsequent reception of the operation information, adding information to said first storing part, which indicates that the abnormality indicated by the operation information lasts from the reception of the operation information to the reception of the elimination information.

8. A non-transient computer readable recording medium storing a program to cause a computer to execute the information processing method as claimed in claim 7.

9. The information processing system as claimed in claim 1, wherein the operating state includes a plurality of types of the abnormalities.

10. The information processing system as claimed in claim 1, wherein elimination information is positively made by the device upon inputting the elimination information being input by the user in asynchronization with the predetermined time interval.

* * * * *